(12) United States Patent
Kimura

(10) Patent No.: US 9,703,404 B2
(45) Date of Patent: Jul. 11, 2017

(54) DEVICE AND METHOD FOR DETECTING POSITION CODE

(71) Applicant: Panasonic Corporation, Osaka (JP)

(72) Inventor: Tomohiro Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 347 days.

(21) Appl. No.: 14/127,787

(22) PCT Filed: May 15, 2013

(86) PCT No.: PCT/JP2013/003088
§ 371 (c)(1),
(2) Date: Dec. 19, 2013

(87) PCT Pub. No.: WO2013/179595
PCT Pub. Date: Dec. 5, 2013

(65) Prior Publication Data
US 2014/0139428 A1 May 22, 2014

(30) Foreign Application Priority Data

May 31, 2012 (JP) .................. 2012-125278
May 31, 2012 (JP) .................. 2012-125279
May 31, 2012 (JP) .................. 2012-125280

(51) Int. Cl.
*G06F 3/041* (2006.01)
*G06F 3/042* (2006.01)
*G06K 19/06* (2006.01)

(52) U.S. Cl.
CPC .............. *G06F 3/041* (2013.01); *G06F 3/042* (2013.01); *G06K 19/06* (2013.01); *G06K 19/06037* (2013.01)

(58) Field of Classification Search
None
See application file for complete search history.

(56) References Cited

U.S. PATENT DOCUMENTS

| 2003/0085884 A1 | 5/2003 | Pettersson et al. |
| 2003/0128194 A1* | 7/2003 | Pettersson ............. G06F 3/0317 345/173 |
| 2005/0173533 A1 | 8/2005 | Pettersson |

FOREIGN PATENT DOCUMENTS

| JP | 2004-535011 | 11/2004 |
| JP | 2005-507535 | 3/2005 |

(Continued)

OTHER PUBLICATIONS

Title: Rotation compensated human iris matching Author: Monro, Donald M. 1 ; Rakshit, Soumyadip 1 Publication info: Proceedings—SAFE 2007: Workshop on Signal Processing Applications for Public Security and Forensics Institute of Electrical and Electronics Engineers Inc. (Jan 1, 2007).*

(Continued)

*Primary Examiner* — Jennifer Mehmood
*Assistant Examiner* — Parul Gupta
(74) *Attorney, Agent, or Firm* — Wenderoth, Lind & Ponack, L.L.P.

(57) ABSTRACT

A position code consists of a plurality of cyclic main number sequences that are each shifted by a predetermined amount and arranged in a one-dimensional direction, each of the cyclic main number sequences consisting of cycles of a main number sequence that has a base number b and a length K and having K types of characteristic partial sequences with a predetermined length. A detection section is configured to detect, from each of at least two adjacent cyclic main number sequences among the plurality of cyclic main number sequences, a partial sequence having a length N and satisfying "K+K*(b−1)*N≤$b^N$". A determination section is (Continued)

configured to determine a place of each of the detected partial sequences having the length N in each of the cyclic main number sequences. An acquisition section is configured to acquire, based on the determined places, positional information given to a detected position in the position code.

10 Claims, 10 Drawing Sheets

(56) References Cited

FOREIGN PATENT DOCUMENTS

| JP | 2006-511864 | 4/2006 |
|---|---|---|
| WO | 01/71653 | 9/2001 |
| WO | 03/001440 | 1/2003 |
| WO | 03/038741 | 5/2003 |
| WO | 2004/057526 | 7/2004 |

OTHER PUBLICATIONS

Title: An object-oriented pen-based recognizer for handprinted characters Author: Klauer, B. 1 ; Waldschmidt, K. 1 Publication info: Computer Analysis of Images and Patterns. 5th International Conference, CAIP '93 Proceedings : 586-93;xvi+857. Springe.*
Title: Image Quality Enhancement Using the Direction and Thickness of Vein Lines for Finger-Vein Recognition (abstract) Author: Park, Young Ho; Park, Kang Ryoung Publication info: International Journal of Advanced Robotic Systems 9 (2012).*
Title: A method for extracting phase and orientation information for finger vein recognition (abstract) Author: Wang, Ke-Jun 1 ; Liu, Jing-Yu 1 ; Yang, Xiao-Fei 1 Publication info: Zhongnan Daxue Xuebao (Ziran Kexue Ban)/Journal of Central South University (Science and Technology) 42.Suppl. 1 (Sep. 1, 2011): 794-799.*
International Search Report issued Aug. 20, 2013 in International (PCT) Application No. PCT/JP2013/003088.

* cited by examiner (a)          (b)

FIG. 6

| POSITION CODE mx | 0 | 0 | 1 | 1 |
|---|---|---|---|---|
| POSITION CODE my | 1 | 0 | 0 | 1 |
| DETECTING STATE (NO ROTATION) | | | | |
| DETERMINED DIRECTION OF ALIGNMENT | | | | |
| DETERMINED POSITION CODE m'x | 0 | 0 | 1 | 1 |
| DETERMINED POSITION CODE m'y | 1 | 0 | 0 | 1 |

FIG. 7

| POSITION CODE mx | 0 | 0 | 1 | 1 |
|---|---|---|---|---|
| POSITION CODE my | 1 | 0 | 0 | 1 |
| DETECTING STATE (ROTATED BY 90 DEGREES) | | | | |
| DETERMINED DIRECTION OF ALIGNMENT | | | | |
| DETERMINED POSITION CODE m'x | 1 | 0 | 0 | 1 |
| DETERMINED POSITION CODE m'y | 1 | 1 | 0 | 0 |

FIG. 8

| POSITION CODE mx | 0 | 0 | 1 | 1 |
|---|---|---|---|---|
| POSITION CODE my | 1 | 0 | 0 | 1 |
| DETECTING STATE (ROTATED BY 180 DEGREES) | | | | |
| DETERMINED DIRECTION OF ALIGNMENT | | | | |
| DETERMINED POSITION CODE m'x | 1 | 1 | 0 | 0 |
| DETERMINED POSITION CODE m'y | 0 | 1 | 1 | 0 |

FIG. 9

| POSITION CODE mx | 0 | 0 | 1 | 1 |
|---|---|---|---|---|
| POSITION CODE my | 1 | 0 | 0 | 1 |
| DETECTING STATE (ROTATED BY 270 DEGREES) | | | | |
| DETERMINED DIRECTION OF ALIGNMENT | | | | |
| DETERMINED POSITION CODE m'x | 0 | 1 | 1 | 0 |
| DETERMINED POSITION CODE m'y | 0 | 0 | 1 | 1 |

DEVICE AND METHOD FOR DETECTING POSITION CODE

TECHNICAL FIELD

The present disclosure relates to a device and method for detecting a position code, and also relates to a method for generating a position code, a method for decoding a detected position code, a computer program for executing these methods, and products in which a position code is used, etc.

BACKGROUND ART

Technology for specifying a position within a surface utilizing a position code set on the surface has been already devised. As such technology, for example, methods for generating and decoding a position code disclosed in Patent Literature 1 are known. Hereinafter, the conventional method disclosed in Patent Literature 1 will be described briefly.

The conventional method disclosed in Patent Literature 1 uses three types of sequences, which are a main number sequence, a primary number sequence, and a secondary number sequence, for generating a position code. In addition, Patent Literature 1 discloses a method of generating a graphical position code, printing the position code on a paper surface, optically detecting the position code with an input section included in an electronic pen, and distinguishing a coordinate position based on the detected position code.

In Patent Literature 1, a sequence that is in binary numbers and whose length is 63 is illustrated as the main number sequence. A sequence generated by linking, to the tail end of the main number sequence, a starting end of the same main number sequence is referred to as a cyclic main number sequence. The cyclic main number sequence in Patent Literature 1 is a sequence in which it is possible to clearly determine the place of any partial sequence whose length is 6 in the cyclic main number sequence, with respect to the main number sequence. Here, the place of a partial sequence with respect to the main number sequence corresponds to a remainder obtained when shift length of the beginning of the partial sequence from the beginning of the main number sequence in a predetermined direction is divided with the length of the main number sequence. Thus, when there is a partial sequence whose length is 6 extracted from a cyclic main number sequence whose main number sequence has a length of 63, the place of the extracted partial sequence can be specified in a range of 0 to 62.

Two or more main number sequences are each moved (shifted) in a predetermined direction depending on a designated cyclic shift amount and serially arranged next to each other to form a cyclic main number sequence. The difference in a cyclic shift amount between two adjacent cyclic main number sequences is referred to as a difference number. This difference number is obtained by extracting, from two adjacently arranged cyclic main number sequences, respective partial sequences whose shift lengths are equal, specifying the places of the two extracted partial sequences with respect to the main number sequences, and calculating the difference of the two specified places. It should be noted that the above described partial sequences whose shift lengths are equal refers to partial sequences whose shift amounts (shift widths) of the beginning of respective cyclic main number sequence from the beginning of respective partial sequence are equal. Furthermore, the partial sequences whose shift lengths are equal are not limited to that defined above as long as a difference number between cyclic main number sequences can be appropriately specified. For example, it is possible to use partial sequences corresponding to each other with a positional relationship within a two-dimensional plane by position codes arranged in the two-dimensional plane, or use partial sequences corresponding to each other with a positional relationship within a three dimensional space by position codes arranged in the three dimensional space. In Patent Literature 1, usage of a value from 5 to 58 as the difference number is illustrated. A sequence whose terms are difference numbers is a primary number sequence.

The difference number is broken down into multiple digits based on a mixed base number (mixed radix number). A sequence whose terms are values of each of the digits is defined as a secondary number sequence. Illustrated in Patent Literature 1 as the mixed base number are, sequentially from a base number having a low order, 3, 3, 2, and 3. Thus, the number of secondary number sequences derived from a single primary number sequence is four. The four secondary number sequences are each formed from the cyclic main number sequence, and the length of the main number sequence that is the basis for forming each of the cyclic main number sequences are configured to be a prime with respect to each other (not having a common divisor other than 1). The respective lengths illustrated in Patent Literature 1 for the main number sequences that are the basis for forming the cyclic main number sequences with four secondary number sequences are 236, 233, 31, and 241.

With regard to the four secondary number sequences, a place in each of the secondary number sequences can be specified by acquiring a partial sequence having a length of 5 from each of the secondary number sequences. The place in a secondary number sequence shows desired positional information.

An arrangement of multiple cyclic main number sequences described above is referred to as a position code, and the position code is generated through encoding of the positional information. In addition, positional information can be estimated from a position code of a predetermined range acquired from detecting etc. This is referred to as decoding of the position code.

Furthermore, in the conventional method disclosed in Patent Literature 1, regarding a case where positional information is estimated in a two-dimensional plane, a partial sequence having a length longer than the length of a partial sequence required for estimating the positional information is acquired in order to remove the effect of uncertainty in a detected partial sequence when the position code is rotated (hereinafter, referred to as uncertainty due to rotation). For example, in the above described example of estimating the positional information from a partial sequence having a length of 6, a partial sequence having a length of 8 is acquired in order to remove uncertainty due to rotation.

CITATION LIST

Patent Literature

Japanese Laid-Open Publication (translation of PCT application) No. 2004-535011

SUMMARY OF THE INVENTION

Problems to be Solved by the Invention

However, the conventional method disclosed in Patent Literature 1 has a problem where, when an error is contained in a partial sequence acquired (detected) from a cyclic main number sequence, the place of the partial sequence with respect to the main number sequence becomes misidentified, ultimately resulting in wrongly decoding a position code, i.e., wrongly estimating positional information. In addition, in the conventional method, it is necessary to acquire (detect), in order to remove uncertainty due to rotation, a partial sequence having a length longer that a length of a partial sequence required for estimating positional information.

Therefore, in the present disclosure, description will be provided regarding a device and method for detecting a position code, which are designed to improve resistance against error and improve removal of uncertainty due to rotation.

Solution to the Problems

A detecting device of the present disclosure is configured to detect a position code. The position code consists of a plurality of cyclic main number sequences that are each shifted by a predetermined amount and arranged in a one-dimensional direction, each of the cyclic main number sequences consisting of cycles of a main number sequence that has a base number b and a length K and having K types of characteristic partial sequences with a predetermined length. The detecting device includes: a detection section configured to detect, from each of at least two adjacent cyclic main number sequences among the plurality of cyclic main number sequences, a partial sequence having a length N and satisfying "$K+K*(b-1)*N \leq b^N$ (b, K, and N are integers equal to or larger than 2)"; a determination section configured to determine a place of each of the detected partial sequences having the length N in each of the cyclic main number sequences; and an acquisition section configured to acquire, based on the determined places, positional information given to a detected position in the position code.

Advantageous Effects of the Invention

With the device and method for detecting a position code of the present disclosure, it is possible to expect improvement in the resistance against error contained in a detected partial sequence, and removal of uncertainty due to rotation.

BRIEF DESCRIPTION OF THE DRAWINGS

FIG. 6 is for describing determining of a position code at a regular position in which a mark image is not rotated.

FIG. 7 is for describing the determining of a position code at a position where the mark image in FIG. 6 is rotated clockwise by 90 degrees from the regular position.

FIG. 8 is for describing the determining of a position code at a position where the mark image in FIG. 6 is rotated clockwise by 180 degrees from the regular position.

FIG. 9 is for describing the determining of a position code at a position where the mark image in FIG. 6 is rotated clockwise by 270 degrees from the regular position.

DESCRIPTION OF EMBODIMENTS

<Knowledge that has been the Basis for the Present Invention>

With the conventional method disclosed in Patent Literature 1, when an error is contained in a partial sequence detected from a cyclic main number sequence, there has been a problem of the place of the partial sequence with respect to the main number sequence being misidentified, and ultimately resulting in wrongly decoding a position code, i.e., wrongly estimating positional information. In addition, in the conventional method, the has been a problem of needing to detect, in order to remove uncertainty due to rotation, a partial sequence having a length longer than a length of a partial sequence required for estimating positional information.

<Technique on which the Present Inventors have Focused>

Therefore, the present inventors have come up with a new original idea regarding a technique that enables effective acquiring of a correct partial sequence from a detected partial sequence, even when the detected partial sequence contains an error due to identification failure of the partial sequence, uncertainty due to rotation, etc.

Various modes of the present invention based on the new original idea will be described in the following.

<Summary of Each Mode of the Invention>

Figure 10:
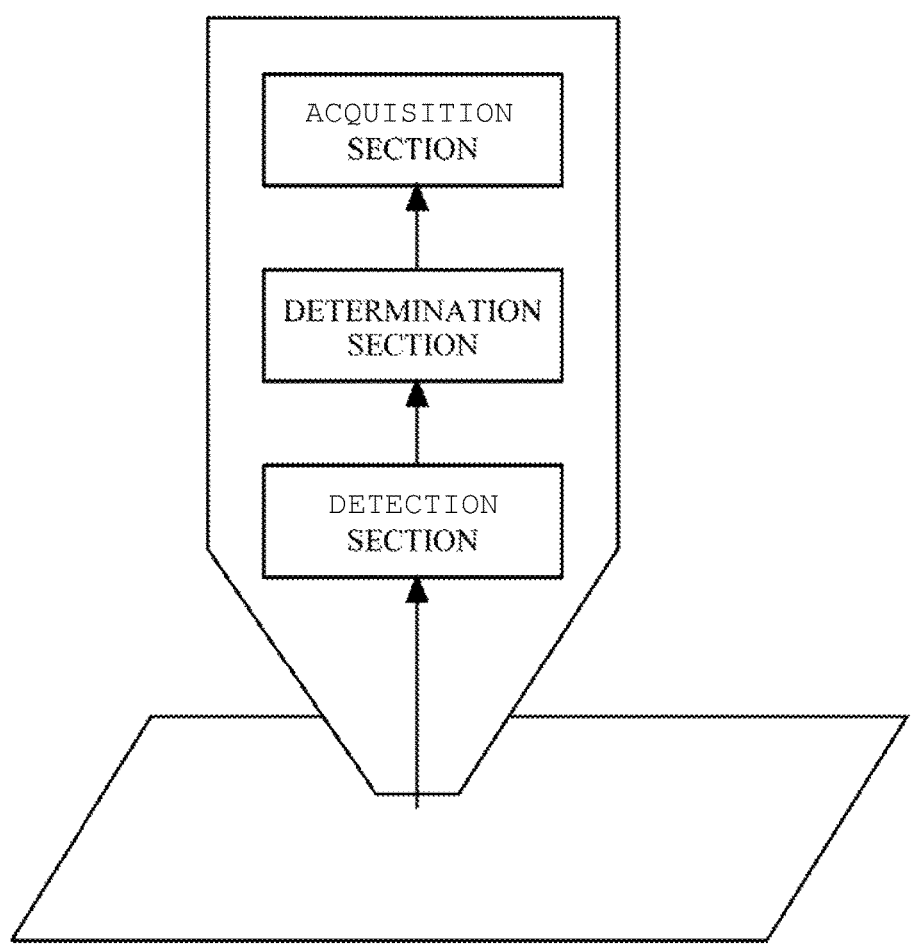
FIG. 10 illustrates a schematic configuration of a device for detecting a position code in the present embodiment.

A detecting device for detecting a position code according to one mode of the present disclosure based on the invention is, for example, built in a device such as an electronic pen for optically or electronically identifying a coordinate position. The detecting device according to one mode of the present disclosure is configured to detect a position code. The position code consists of a plurality of cyclic main number sequences that are each shifted by a predetermined amount and arranged in a one-dimensional direction, each of the cyclic main number sequences consisting of cycles of a main number sequence that has a base number b and a length K and having K types of characteristic partial sequences with a predetermined length. The detecting device includes: a detection section configured to detect, from each of at least two adjacent cyclic main number sequences among the plurality of cyclic main number sequences, a partial sequence having a length N and satisfying "$K+K*(b-1)*N \leq b^N$ (b, K, and N are integers equal to or larger than 2)"; a determination section configured to determine a place of each of the detected partial sequences having the length N in each of the cyclic main number sequences; and an acquisition section configured to acquire, based on the determined places, positional information given to a detected position in the position code. For example, see FIG. 10.

With this mode, it is possible to expect improvement in resistance against error contained in a detected partial sequence, and removal of uncertainty due to rotation.

In another mode, for example, the determination section can determine a place of each of the detected partial sequence having the length N in each of the cyclic main number sequences, by specifying a characteristic partial sequence having the smallest Hamming distance from each of the detected characteristic partial sequences having the length N, among the K types of characteristic partial sequences. Furthermore, the acquisition section can: obtain, from the determined places, a difference of places between adjacent cyclic main number sequences as a primary number sequence; obtain, as a plurality of secondary number sequence, numerical values of each digit obtained when the primary number sequence is represented as mixed base numbers; determine places of partial sequences having a length L (L is an integer equal to or larger than 2, for example L=N−1), each acquired from the plurality of secondary number sequences, in the secondary number sequences; and acquire positional information given to the detected position of the position code based on these places.

With this other mode, it is possible to effectively achieve improvement in resistance against error contained in the detected partial sequences.

In another mode, for example, for each of the detected partial sequences having the length N, the determination section can: calculate a minimum Hamming distance from the cyclic main number sequences, and a minimum Hamming distance from supplementary number sequences obtained by inverting a polarity of each of the cyclic main number sequence and reversing the alignment order thereof; and conduct, when the minimum Hamming distance from the supplementary number sequences is smaller than the minimum Hamming distance from the cyclic main number sequences, a rotation removal process against of the detected partial sequences having the length N; or calculate and obtain a total value of a minimum Hamming distances from the cyclic main number sequences and calculate and obtain a total value of a minimum Hamming distances from supplementary number sequences, and conduct, when the total value of the minimum Hamming distances from the supplementary number sequences is smaller than the total value of the minimum Hamming distances from the cyclic main number sequences, a rotation removal process against the detected partial sequence having the length N. For example, the determination section can correct the effect of rotation generated in the position code in increments of 90 degrees, based on the calculated minimum Hamming distance or on the total value thereof.

With this mode, it is possible to achieve effective removal of uncertainty due to rotation.

In addition, those that are conceivable as other modes of the present disclosure also include a product formed so as to be able to detect the position code, a method for detecting a position code and a method for generating a position code, a storage medium having stored therein, in a computer readable manner, a program for executing these methods.

<Detailed Description of Each Mode of the Invention>
[Description Regarding Generation of Position Code]

The position code is used for encoding positional information in one or more dimensions. In the present embodiment, a case with one dimension (e.g., x-direction) will be discussed within a scope of not compromising generality.

As described above, a cyclic main number sequence used in the present embodiment is formed by linking, at their tail ends and starting ends, a plurality of main number sequences having a predetermined base number and length. The cyclic main number sequence has a property of being able to specify a place in the main number sequence using multiple different partial sequences having a predetermined length. In addition, the multiple different partial sequences have a property in which a sequence obtained by altering one term in a partial sequence does not match any of the multiple partial sequences.

Here, the base number of the main number sequence is defined as b, the length (cycle length of the cyclic main number sequence) of the main number sequence is defined as K, and the length of a partial sequence in the cyclic main number sequence is defined as N. The number of possible partial sequences that are different from each other in the cyclic main number sequence is K, since the number is the same as the length of the main number sequence. With a partial sequence having a base number b and a length N, the number of possible sequences having one term thereof different from the partial sequence is (b−1)*N. On the other hand, the number of possible partial sequences having the base number b and the length N is $b^N$. As described above, the necessary condition for having a property of mutually different K types of partial sequences being different from a sequence having one term thereof different from any one of the partial sequences is the following formula [1].

$$K+K*(b-1)*N \le b^N \quad [1]$$

By using the condition in formula [1], it is possible to uniquely determine a place of a partial sequence with respect to the cyclic main number sequence, while allowing an error in one term within the partial sequence.

In the following, the present embodiment will be described using as an example a case in which the base number of a main number sequence is b=2, the length of the main number sequence is K=7, and the length of a partial sequence is N=6. In this case, the necessary condition of formula [1] is satisfied, since the left side in formula [1] is K+K*(b−1)*N=7+7*1*6=49, and the right side in formula [1] is $b^N=2^6=64$.

On the other hand, in the Example disclosed in Patent Literature 1, the base number of a main number sequence b=2, the length of the main number sequence is K=63, and the length of a partial sequence is N=6. Therefore, the necessary condition of formula [1] is not satisfied, since the left side in formula [1] is K+K*(b−1)*N=63+63*1*6=441, and the right side in formula [1] is $b^N=2^6=64$.

In the present embodiment, a main number sequence M having a base number b=2 and a length K=7 is assumed as, for example, the next sequence.

$$M = \text{"0,0,1,0,1,1,1"}$$

Here, in a cyclic main number sequence obtained by cycling the main number sequence M, the following relationship exists between seven mutually different partial sequences whose length is N=6, and a place with respect to the main number sequence.

| Partial sequence | | Place with respect to Main Number Sequence |
|---|---|---|
| 0, 0, 1, 0, 1, 1 | ---> | 0 |
| 0, 1, 0, 1, 1, 1 | ---> | 1 |
| 1, 0, 1, 1, 1, 0 | ---> | 2 |
| 0, 1, 1, 1, 0, 0 | ---> | 3 |
| 1, 1, 1, 0, 0, 1 | ---> | 4 |
| 1, 1, 0, 0, 1, 0 | ---> | 5 |
| 1, 0, 0, 1, 0, 1 | ---> | 6 |

The position code is encoding of positional information by arranging a plurality of cyclic main number sequences each given a cyclic shift amount determined in accordance with its position within a surface or space. More specifically, the plurality of cyclic main number sequences which are each shifted in accordance with a cyclic shift amount are arranged side by side in a dimension (e.g., the x-direction in the x-y plane) in which the positional information is to be encoded. Sequences of the cyclic main number sequences extend in a dimension (e.g., the y-direction in the x-y plane) that is orthogonal to the dimension intended for encoding.

For the plurality of cyclic main number sequences or one part thereof, values thereof may not be actually printed or displayed in an explicit manner, and those values may be printed or displayed in a graphical manner. There are various means for representing those sequences, and the means is not limited.

Figure 1A:
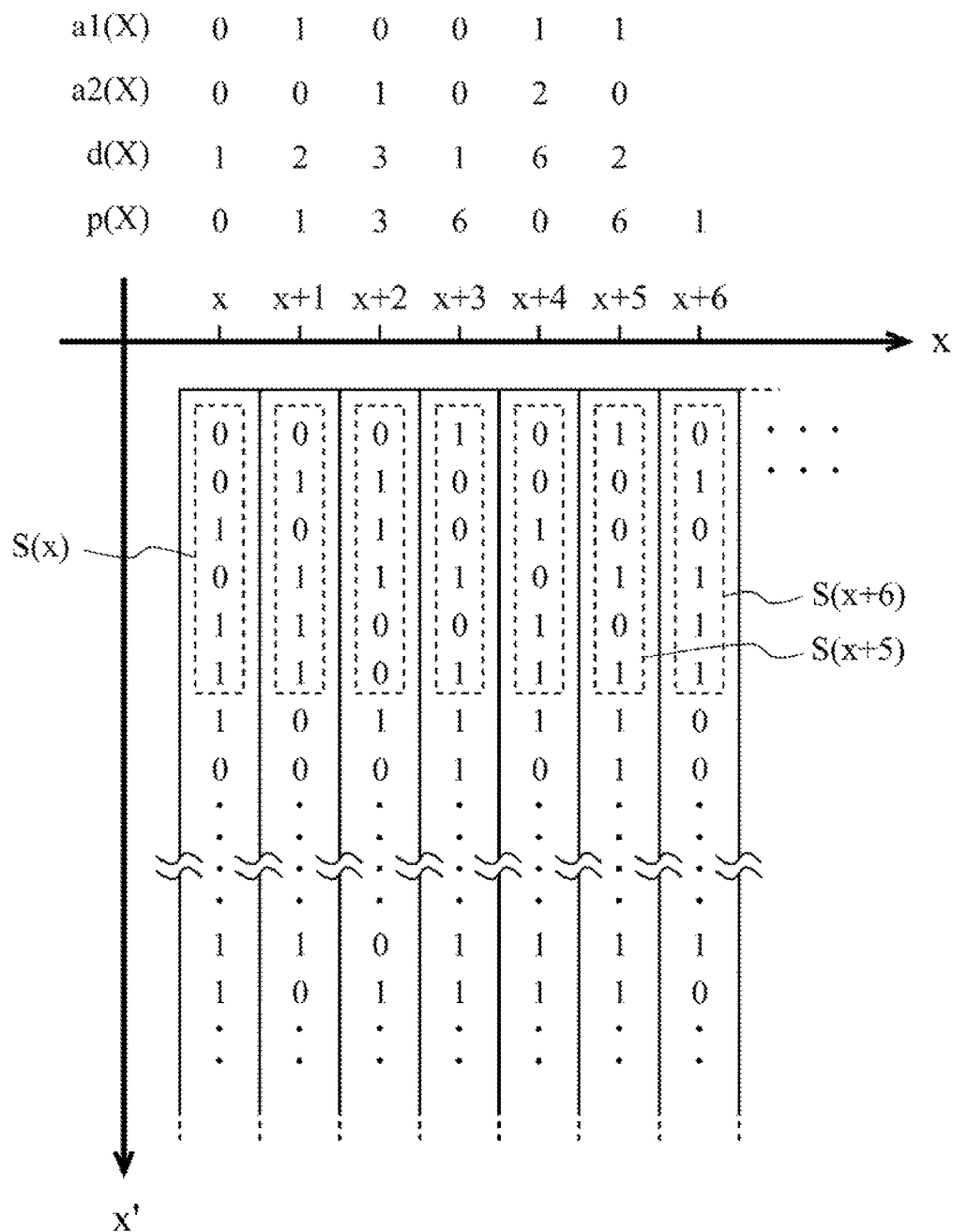
FIG. 1A schematically shows an example of a position code arranged in the X-direction in the present embodiment.

FIG. 1A shows an example of encoding a position code in the x-direction of the x-y plane. In FIG. 1A, a plurality of cyclic main number sequences (in the example in FIG. 1A, the seven sequences of x to x+6) extending in the y-direction (the position code of the x-direction is defined as "x'-direction") orthogonal to the x-direction are arranged side by side in the x-direction. In FIG. 1A, parts enclosed by a dashed line in the respective cyclic main number sequences each indicate a partial sequence S(X) having a length of N=6, and the place indicated by the partial sequence S(X) with respect to the main number sequence is represented as p(X). With respect to the main number sequence, the places p(x) to p(x+6) of the partial sequences S(x) to S(x+6) located respectively at the beginning of the seven cyclic main number sequences x to x+6 shown in FIG. 1A are 0, 1, 3, 6, 0, 6, and 1, respectively, based on the above described relationship.

Here, a difference number d(X) between adjacent places p(X) is represented by the following formula [2]. It should be noted that "mod K" represents a modulo K calculation. The length K of the main number sequence is 7.

$$d(x)=\{p(x+1)-p(x)\} \bmod K \qquad [2]$$

The values of difference numbers d(x) to d(x+5) of the example FIG. 1A calculated in accordance with formula [2] are 1, 2, 3, 1, 6, and 2, respectively. A sequence consisting of an alignment of the difference number d(X) is referred to as a primary number sequence, and a difference number sequence (e.g., difference numbers d(x) to d(x+4)) having a length of 5 in the primary number sequence gives a partial sequence of the primary number sequence. When the partial sequences selected from the plurality of cyclic main number sequences are located at a part other than the beginning as shown in FIG. 1A, the values of the places p(x) to p(x+6) become different values. However, in the end, the calculated values of the difference numbers d(x) to d(x+5) will be the same as above of 1, 2, 3, 1, 6, and 2, respectively, since a uniform value by the modulo K is the modulus is added to the places p(x) to p(x+6).

The primary number sequence is a sequence in which K is the base number, and the maximum number of the possible difference number sequences having a length of 5 is a permutation of $K^5$. For example, when K=7, the maximum number of the possible difference number sequences having a length of 5 is a permutation of $7^5$=16807. Therefore, when a difference number sequence having a length of 5 can be uniquely determined as a partial sequence of the primary number sequence, it is possible to design a primary number sequence having a length of 16807 at maximum, and a position in the x-direction in a range of 0 to 16806 can be represented by the primary number sequence. However, it is difficult to obtain the place within the primary number sequence from the acquired difference number sequence having a length of 5 from a calculation, and a table for converting the difference number sequence having a length of 5 to a place in the primary number sequence is generally used. Therefore, when a long primary number sequence is used, a problem arises where a large conversion table proportional to the length of the primary number sequence becomes necessary.

In order to solve this problem, it is conceivable to use a plurality of secondary number sequences whose lengths are shorter than that of the primary number sequence. Secondary number sequences having short length enable significant reduction of the size of the table for converting the partial sequence into a place in the primary number sequence. By using a combination of plurality of secondary number sequences, close to the possible maximum range of positions represent by the primary number sequence can be represented.

The plurality of secondary number sequences can be determined in the following manner. First, the difference number d(X) is limited within a range that can be factorized into at least two different numbers. In the above described example in which the length of the main number sequence is K=7, the number of the difference numbers d(X) is limited to 6, which can be factorized as 2*3. For the purpose of reducing the size of the conversion table that holds the relationship between a partial sequence and a position, it is preferable to select the maximum value of the factor as small as possible. Next, the number of the secondary number sequences is a number that is an element obtained by factorizing the difference number. In this example, the number of the secondary number sequence is 2. Furthermore, in the secondary number sequence, elements obtained from factorizing the difference number are used as base numbers.

When the same partial sequences having a length of 5 represents characteristic places in the secondary number sequences, the maximum lengths of the secondary number sequences are $2^5$=32 and $3^5$=243. The lengths of the plurality of secondary number sequences is selected in the range of equal to or smaller than the above described maximum length, such that they are mutually a prime (not having a divisor other than 1). A combination of partial sequences obtained from each of the secondary number sequences with selected lengths is characteristic within the range of a product of lengths of all the secondary number sequences.

In the present embodiment, two secondary number sequences A1 and A2 are assumed. The secondary number sequence A1 is a sequence having a base number of 2 and a length of 31. The secondary number sequence A2 is a sequence having a base number of 3 and a length of 241. The secondary number sequences A1 and A2 are shown in the following. In this case, the range that can be represented by the two secondary number sequences is 31*241=7471.

A1=0, 0, 0, 0, 0, 1, 0, 0, 1, 1, 0, 0, 0, 1, 1, 1, 1, 0, 0, 1, 0, 1, 0, 1, 1, 0, 1, 1, 1, 0, 1

A2=0, 0, 0, 0, 0, 1, 0, 2, 0, 0, 0, 0, 2, 0, 0, 2, 0, 1, 0, 0, 0, 1, 1, 2, 0, 0, 0, 1, 2, 0, 0, 2, 1, 0, 0, 0, 2, 1, 1, 2, 0, 1, 0, 1, 0, 0, 1, 2, 1, 0, 0, 1, 0, 0, 2, 2, 0, 0, 0, 2, 2, 1, 0, 2, 0, 1, 1, 0, 0, 1, 1, 1, 0, 1, 0, 1, 1, 0, 1, 2, 0, 1, 1, 1, 1, 0, 0, 2, 0, 0, 2, 0, 1, 2, 0, 2, 2, 0, 1, 0, 2, 1, 0, 1, 2, 1, 1, 0, 1, 1, 1, 2, 2, 0, 0, 1, 0, 1, 2, 2, 2, 0, 0, 2, 2, 2, 0, 1, 2, 1, 2, 0, 2, 0, 0, 1, 2, 2, 0, 1, 1, 2, 1, 0, 2, 1, 1, 0, 2, 0, 2, 1, 2, 0, 0, 1, 1, 0, 2, 1, 2, 1, 0, 1, 0, 2, 2, 0, 2, 1, 0, 2, 2, 1, 1, 1, 2, 0, 2, 1, 1, 1, 0, 2, 2, 2, 2, 0, 2, 0, 2, 2, 1, 2, 1, 1, 1, 1, 2, 1, 2, 1, 2, 2, 2, 1, 0, 0, 2, 1, 2, 2, 1, 0, 1, 1, 2, 2, 1, 1, 2, 1, 1, 2, 2, 2, 2, 1, 2, 0, 1, 2, 2, 1, 2, 2, 0, 2, 2, 2, 1, 1

For example, the terms regarding a place X in the two secondary number sequence A1 and A2 are defined respectively as a1(X) and a2(X). The relationship between the difference number d(X) and the terms a1(X) and a2(X) of the secondary number sequence is defined as d(X)=a2(X)*2+ a1(X)+1. In FIG. 1A, 0, 1, 0, 0, 1, 1 are respectively illustrated as the first secondary number sequence a1(x) to a1 (x+5); and 0, 0, 1, 0, 2, 0 are respectively illustrated as the second secondary number sequence a2(x) to a2(x+5).

In FIG. 1A, the partial sequence a1(x) to a1 (x+4), i.e., sequence 0, 1, 0, 0, 1, having a length of 5 in the first secondary number sequence can be found at a place "4" from the beginning of the secondary number sequence A1. Furthermore, the partial sequence a2(x) to a2(x+4), i.e., sequence 0, 0, 1, 0, 2, having a length of 5 in the second secondary number sequence can be found at a place "3" from the beginning of the secondary number sequence A2.

Figure 1B:
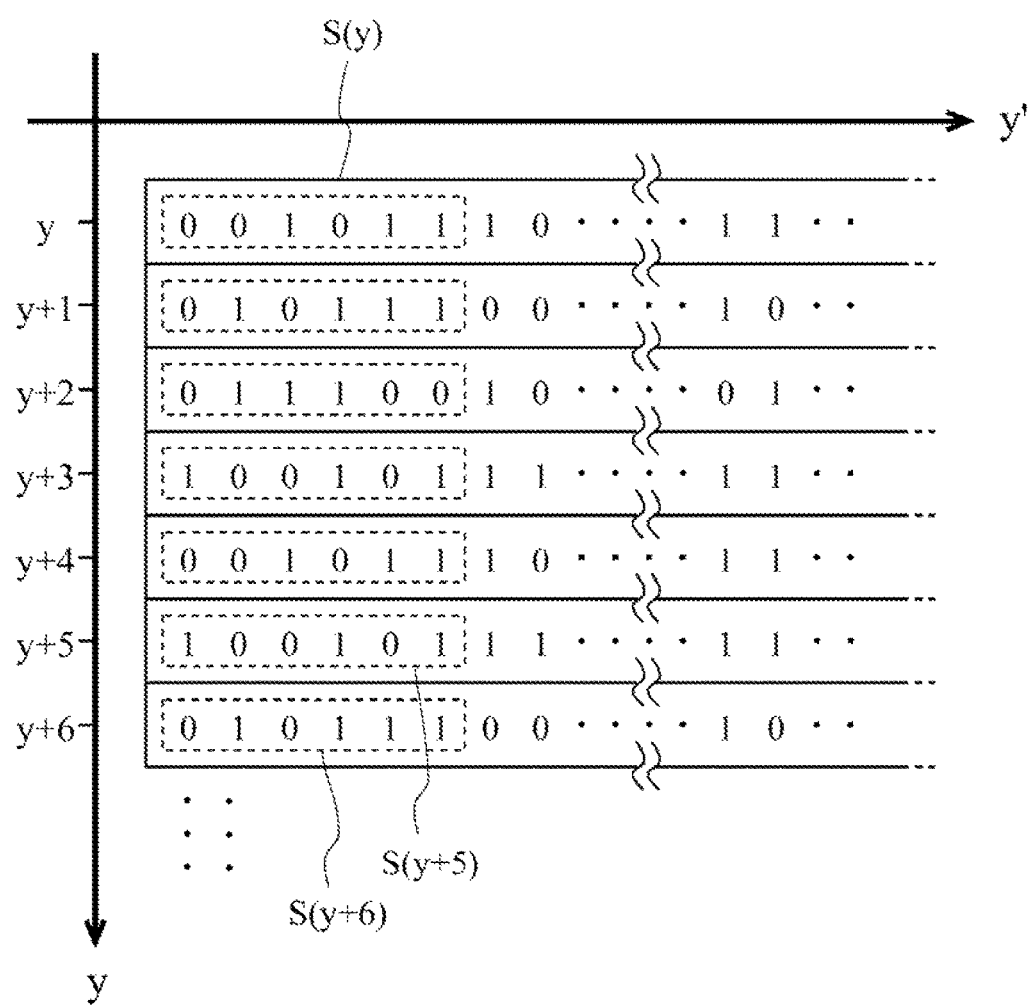
FIG. 1B schematically shows an example of a position code arranged in the Y-direction in the present embodiment.

The above described technique for encoding a position code with respect to one dimension (e.g., x-direction) can be also be executed with respect to two dimensions (e.g., x-y directions) with a similar principle. FIG. 1B shows an example of encoding the position code in the y-direction in the x-y plane. In FIG. 1B, a plurality of cyclic main number sequences (in the example in FIG. 1B, the seven sequences of y to y+6) extending in the x-direction (the position code of the y-direction is defined as "y'-direction") orthogonal to the y-direction are arranged side by side in the y-direction. Although the main number sequence, the primary number sequence, and the secondary number sequence used for encoding the position code in the y-direction within two dimensions may be different from those used for encoding the position code in one dimension (x-direction); the same sequences is used for the example in the present embodiment.

Figure 2:
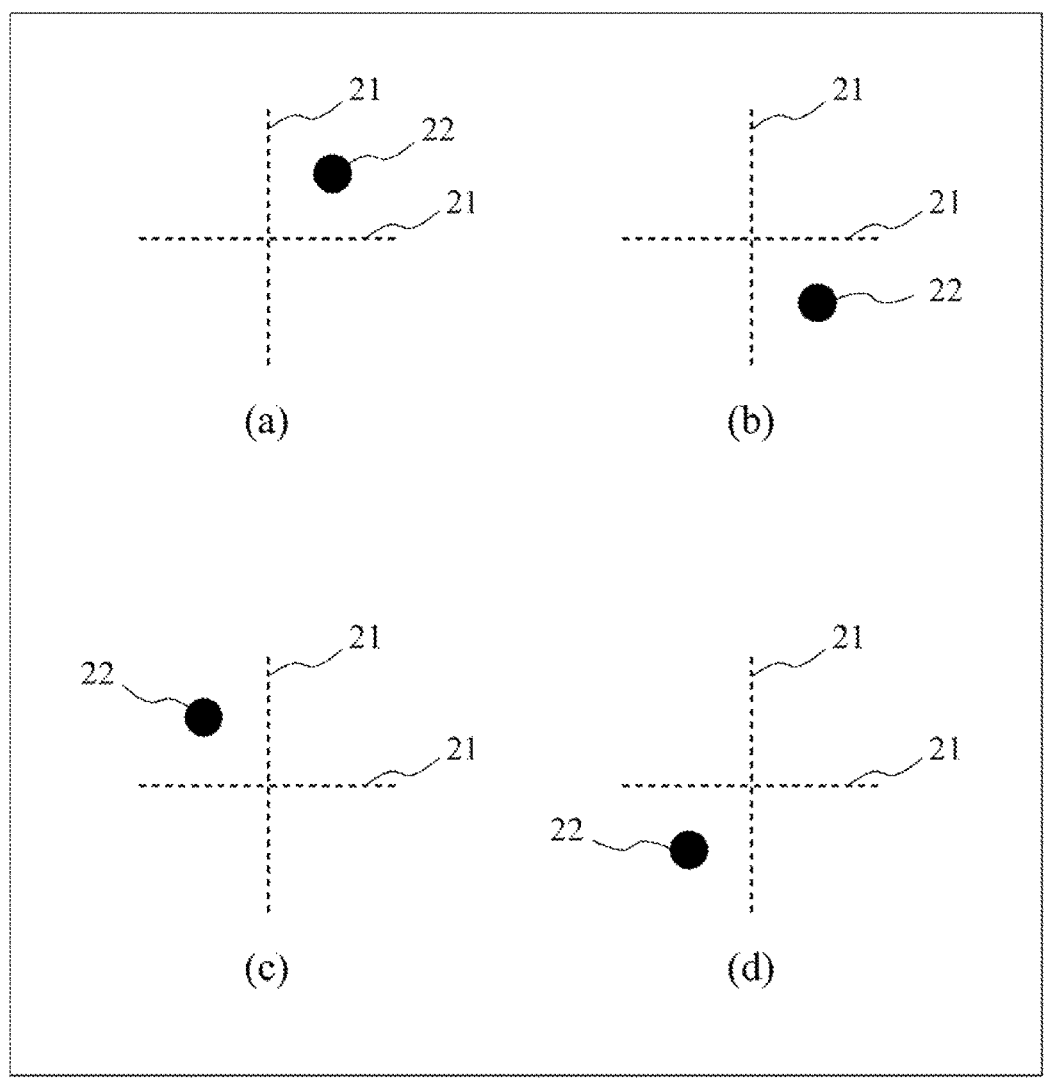
FIG. 2 shows an example of a position code of the present embodiment arranged using a graphical mark image.
Figure 3:
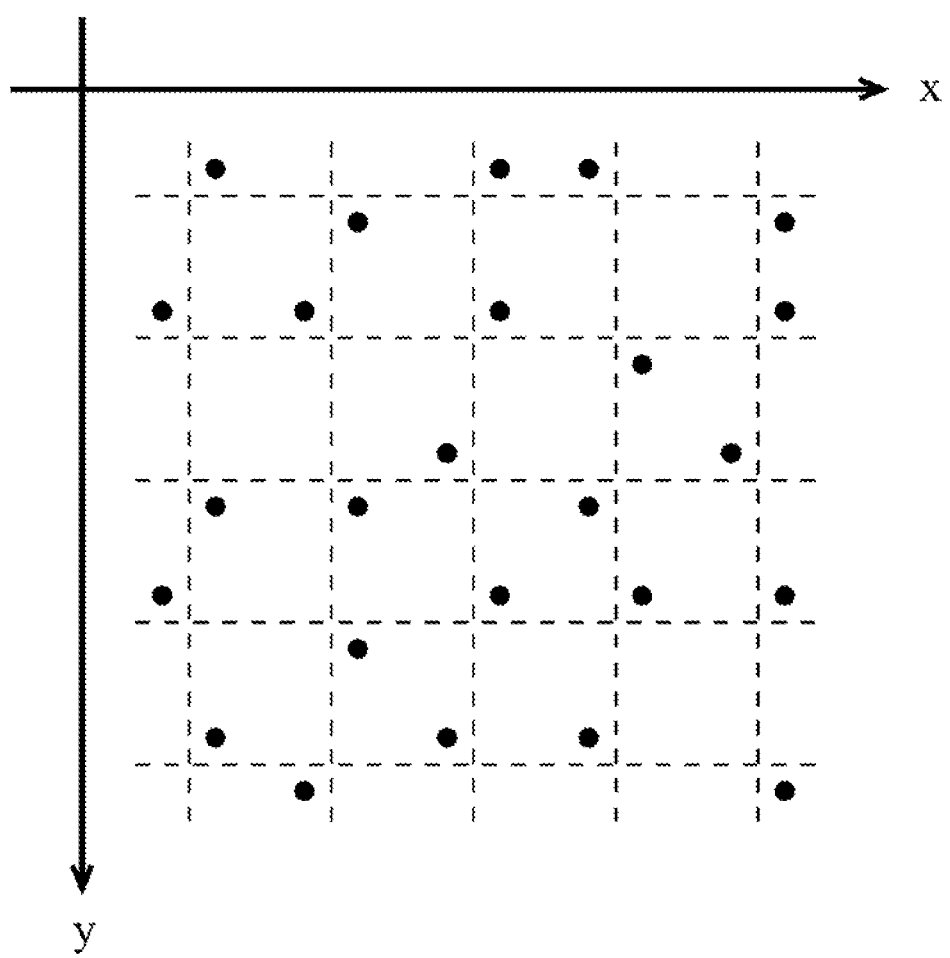
FIG. 3 shows one example of a mark image formed in the x-y plane.

Next, encoding of the position code in a two-dimensional plane will be discussed. Here, the x-y plane will be used as the two-dimensional plane. When the position code in the x-direction and the position code in the y-direction are superimposed, 1 bit of the position code in the x-direction and 1 bit of the position code in the y-direction exist at each coordinate position in the x-y plane. Therefore, 4 types of 2-bit sets of (0, 0), (0, 1), (1, 0), and (1, 1) are used in each coordinate position. These 4 types of 2-bit sets can be, for example, encoded graphically as shown respectively in (a) to (d) of FIG. 2. In (a) to (d) of FIG. 2, a coordinate grid 21 represents reference lines, and a mark 22 represents a set of 1 bit of the position code in the x-direction and 1 bit of the position code in the y-direction, utilizing a position with respect to the reference lines. The coordinate grid 21 does not have to be explicitly printed or displayed. FIG. 3 schematically shows a mark image which is a pattern of a plurality of the marks 22 generated based on the position code in one part of the x-y plane. It is also possible to conduct the graphical encoding in a manner different from that for (a) to (d) in FIG. 2.

The mark image in which the position code is graphically encoded is, for example, optically detected by an optical input section disposed in a detecting device. Examples of conceivable optical input sections include elements such as CCD (Charge Coupled Device) and CMOS (Complementary Metal Oxide Semicon); however, any type of element may be used as long as the mark image can be optically detected. It should be noted that, in the present embodiment, although a configuration of generating a graphical position code and optically detecting the position code is described as an example, the position code of the present disclosure is not limit thereto. The position code may have any configuration as long as a state of a number in accordance with the base number b of the cyclic main number sequence is presented, and this state can be detected by a detecting device. For example the position code may be electrically presented and electrically detected. Furthermore, the position code may be chemically or acoustically presented, and detected by an input section in accordance with thereto.

[Description Regarding Decoding of Position Code]

In the following, a method for decoding the position code will be described by using as an example the above described position code representing the x-y plane. It should be noted that the decoding method described in the following may be conducted by the acquisition section disposed in the detecting device, or by an external device connected to the detecting device through wired connection or wireless communication. Furthermore, it is also possible to have one part of the below described decoding method conducted on the detecting device and have the other part conducted on an external device.

In the decoding method of the present embodiment, by using the above described position code, it is possible to detect a mark image at least in a "range of 6*6" which is six marks both in the vertical and horizontal directions, and decode the positional information.

[Removal of Rotation of Mark Image]

Figure 4:
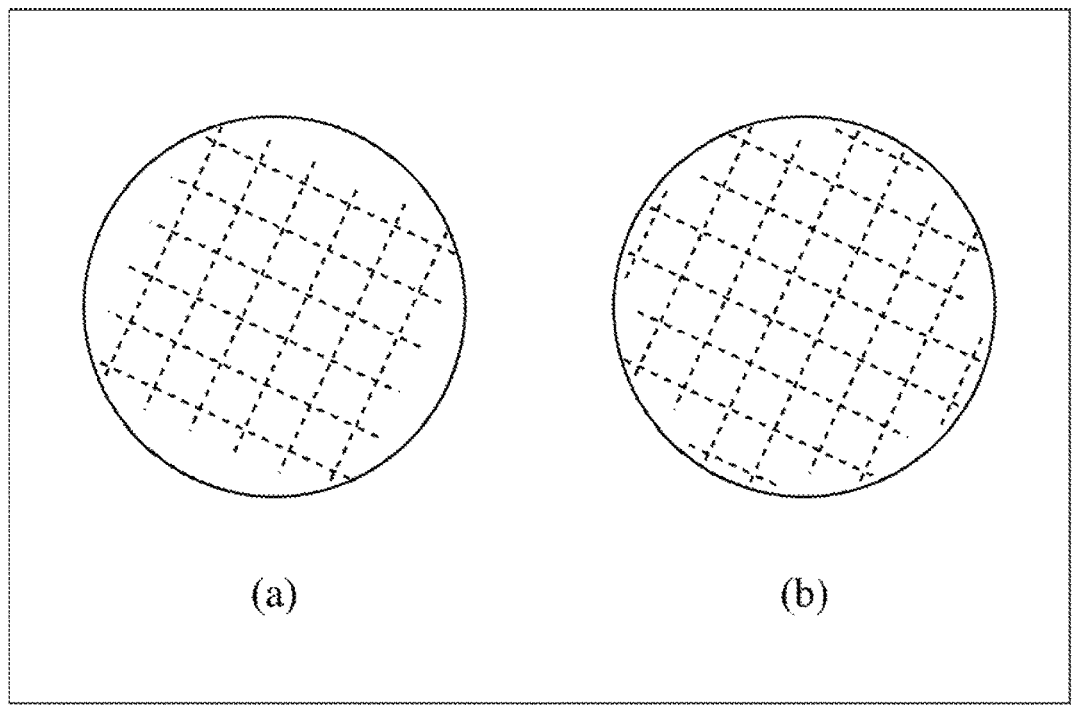
FIG. 4 schematically shows a situation in which a mark image is optically detected.

In (a) of FIG. 4, a situation of optically detecting a mark image having a range of 6*6 is schematically shown. In (a) of FIG. 4, a grid drawn with dashed lines represents a coordinate grid. The coordinate grid may not be explicitly displayed. Although the mark image representing the position code is not diagrammatically represented, the mark image is printed along the coordinate grid (e.g., cf. FIG. 3). In (a) of FIG. 4, a situation is shown in which a mark image is rotated within the x-y plane to be optically detected. No matter how the detected mark image is rotated within the x-y plane, in order to detect the mark image of a 6*6 range, it is sufficient when an image of a range of a circle at least containing the 6*6 mark image (range of the circle shown in (a) of FIG. 4) is acquired. It is needless to say that it is possible to acquire an image of a larger range, or acquire an image of a range that is not circular, such as, for example, rectangular. For example, when acquiring an image within a circle containing the mark image having the range of 6*6, it is also preferable to consider the possibility of detecting a mark image containing, together with marks in the 6*6 range, marks outside the range, as shown in (b) of FIG. 4.

Figure 5:
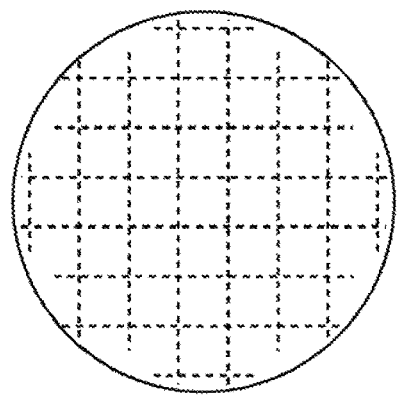
FIG. 5 shows an example in which the mark image in FIG. 4 is rotated in a direction along the x-y plane.

In the following, a method for removing rotation of the detected mark image will be described. First, as shown in FIG. 5, the acquired image is rotated in a direction along the x-y coordinate. However, at this point, uncertainty due to rotation in increments of 90 degrees is remaining in the image. Thus, the removal of uncertainty due to rotation from an image in increments of 90 degrees will be described.

FIG. 6 to FIG. 9 are for describing determination of the position code of the mark contained in the mark image. FIG. 6 is for describing a case in which detecting is conducted at a state in regular position in which the mark image is not rotated. FIG. 7 is for describing a case in which detecting is conducted at a state where the mark image is rotated clockwise from the regular position by 90 degrees. FIG. 8 is for describing a case in which detecting is conducted at a state where the mark image is rotated clockwise from the regular position by 180 degrees. FIG. 9 is for describing a case in which detecting is conducted at a state where the mark image is rotated clockwise from the regular position by 270 degrees.

In each of FIG. 6 to FIG. 9, a position code mx is a position code in the x-direction, and a position code my is a position code in the y-direction. The detecting state represents a state at a time when a mark that has been graphically encoded in accordance with a set of bit values of the position code mx and the position code my is rotated at respective angles and detected. The dashed lines represent a coordinate grid. An x'-arrow shows the correct x'-direction in which the cyclic main number sequences with the position code mx are aligned, and a y'-arrow shows the correct y'-direction in which the cyclic main number sequences with the position code my are aligned. An x"-arrow shows a direction in which the cyclic main number sequences with the position code mx are determined to be aligned, and a y"-arrow shows a direction in which the cyclic main number sequences with the position code my are determined to be aligned. A determined position code m'x is a position code in the x-direction determined based on the direction of the x"-arrow, and a determined position code m'y is a position code in the y-direction determined based on the direction of the y"-arrow.

In the case shown in FIG. 6 where the mark image with no rotation is detected, the graphical position of the detected mark image matches the regular position. Therefore, the determined position codes m'x and m'y have the same bit values as the position codes mx and my. In addition, in the detected mark image, x"-direction and y"-direction in which the cyclic main number sequences with the position code are determined to be aligned are identical to the x'-direction and the y'-direction.

In the case shown in FIG. 7 where the mark image is detected in a state of being rotated clockwise from the regular position by 90 degrees, the graphical position of the detected mark image is different from the regular position (circle drawn with a dashed line). When the position code is determined with such different graphical positions, as a result, the bit value of the position code my appears in the determined position code m'x, and an inverted bit value of the position code mx appears in the determined position code m'y. In addition, since the y"-direction in which the cyclic main number sequences with the determined position code m'y are determined to be aligned is 180 degrees opposite of the x'-direction in which the cyclic main number sequences with the position code mx are aligned; the determined position codes m'y form a cyclic main number sequence obtained by inverting the bit values (polarity) of the position codes mx and reversing the alignment order thereof.

In the case shown in FIG. 8 where the mark image is detected in a state of being rotated clockwise from the regular position by 180 degrees, the graphical position of the detected mark image is true opposite of the regular position (circle drawn with a dashed line). When the position code is determined with such different graphical positions, as a result, an inverted bit value of the position code mx appears in the determined position code m'x, and an inverted bit value of the position code my appears in the determined position code m'y. In addition, since the x"-direction in which the cyclic main number sequences with the determined position code m'x are determined to be aligned is 180 degrees opposite of the x'-direction in which the cyclic main number sequences with the position code mx are aligned; the determined position codes m'x form a cyclic main number sequence obtained by inverting the bit values (polarity) of the position codes mx and reversing the alignment order thereof. Furthermore, since the y"-direction in which the cyclic main number sequences with the determined position code m'y are determined to be aligned is 180 degrees opposite of the y'-direction in which the cyclic main number sequences with the position code my are aligned; the determined position codes m'y form a cyclic main number sequence obtained by inverting the bit values (polarity) of the position codes my and reversing the alignment order thereof.

In the case shown in FIG. 9 where the mark image is detected in a state of being rotated clockwise from the regular position by 270 degrees, the graphical position of the detected mark image is different from the regular position (circle drawn with a dashed line). When the position code is determined with such different graphical positions, as a result, an inverted bit value of the position code my appears in the determined position code m'x, and the bit value of the position code mx appears in the determined position code m'y. In addition to, since the x"-direction in which the cyclic main number sequences with the determined position code m'x are determined to be aligned is 180 degrees opposite of the y'-direction in which the cyclic main number sequences with the position code my are aligned; the determined position codes m'x form a cyclic main number sequence obtained by inverting the bit values (polarity) of the position codes my and reversing the alignment order thereof.

As described above, when the detected mark image is rotated in increments of 90 degrees (FIG. 7, FIG. 8, and FIG. 9), a cyclic main number sequence of position codes whose bit values (polarity) are inverted and whose alignment order is reversed is detected in either one or both of the x'-direction and the y'-direction. Therefore, by properly processing the bit values (polarity) and alignment order of the cyclic main number sequence of the position codes, uncertainty due to rotation in the mark image can be removed. In the following, a method for determining the polarity and alignment order of a cyclic main number sequence will be described in detail.

Table 1 shows: all the number sequences having a length of 6; a minimum Hamming distance (labelled as minimum distance in Table 1) from 7 types of mutually different partial sequences having a length of 6 included in the above described cyclic main number sequence M(0, 0, 1, 0, 1, 1, 1); and a minimum Hamming distance from 7 types of mutually different partial sequences having a length of 6 in a supplementary number sequence M*(0, 0, 0, 1, 0, 1, 1) which is obtained from the cyclic main number sequence M by inverting its bit values (polarity) and reversing its alignment order. For example, a sequence 010111 is a partial sequence of the cyclic main number sequence M and thereby results in a minimum Hamming distance of "0," but is not contained in the supplementary number sequence M* and is different from the closest partial sequence in terms of distance by 1 bit, resulting in a minimum Hamming distance of "1." When a sequence having a length of 6 determined from the detected mark image is tested based on Table 1, and when the minimum Hamming distance is determined, it is possible to identify whether the sequence determined from the mark image is based on the cyclic main number sequence M or based on the supplementary number sequence M*. Here, the sequence determined from the mark image may contain an error. Table 2 shows the minimum Hamming distance in a similar manner when the length of the sequence is 7, and Table 3a and 3b show the minimum Hamming distance in a similar manner when the length of the sequence is 8.

Although not illustrated, the same can be considered for sequences having a length longer than 8.

TABLE 1

| Determined Sequence | Minimum Distance M | M* |
|---|---|---|
| 000000 | 3 | 2 |
| 000001 | 2 | 1 |
| 000010 | 2 | 1 |
| 000011 | 1 | 1 |
| 000100 | 2 | 1 |
| 000101 | 1 | 0 |
| 000110 | 2 | 1 |
| 000111 | 1 | 1 |
| 001000 | 2 | 1 |
| 001001 | 1 | 1 |
| 001010 | 1 | 1 |
| 001011 | 0 | 0 |
| 001100 | 1 | 1 |
| 001101 | 2 | 1 |
| 001110 | 1 | 2 |
| 001111 | 1 | 1 |
| 010000 | 2 | 1 |
| 010001 | 2 | 1 |
| 010010 | 1 | 1 |
| 010011 | 1 | 2 |
| 010100 | 1 | 1 |
| 010101 | 1 | 1 |
| 010110 | 1 | 0 |
| 010111 | 0 | 1 |
| 011000 | 1 | 0 |
| 011001 | 1 | 1 |
| 011010 | 2 | 1 |
| 011011 | 1 | 1 |
| 011100 | 0 | 1 |
| 011101 | 1 | 2 |
| 011110 | 1 | 1 |
| 011111 | 1 | 2 |
| 100000 | 2 | 1 |
| 100001 | 1 | 1 |
| 100010 | 1 | 0 |
| 100011 | 2 | 1 |
| 100100 | 1 | 1 |
| 100101 | 0 | 1 |
| 100110 | 1 | 1 |
| 100111 | 1 | 2 |
| 101000 | 2 | 1 |
| 101001 | 1 | 2 |
| 101010 | 1 | 1 |
| 101011 | 1 | 1 |
| 101100 | 1 | 0 |
| 101101 | 1 | 1 |
| 101110 | 0 | 1 |
| 101111 | 1 | 2 |
| 110000 | 1 | 1 |
| 110001 | 1 | 0 |
| 110010 | 0 | 1 |
| 110011 | 1 | 1 |
| 110100 | 2 | 2 |
| 110101 | 1 | 1 |
| 110110 | 1 | 1 |
| 110111 | 1 | 2 |
| 111000 | 1 | 1 |
| 111001 | 0 | 1 |
| 111010 | 1 | 2 |
| 111011 | 1 | 2 |
| 111100 | 1 | 1 |
| 111101 | 1 | 2 |
| 111110 | 1 | 2 |
| 111111 | 2 | 3 |

TABLE 2

| Determined Sequence | Minimum Distance M | M* |
|---|---|---|
| 0000000 | 4 | 3 |
| 0000001 | 3 | 2 |
| 0000010 | 3 | 2 |
| 0000011 | 2 | 1 |
| 0000100 | 3 | 2 |
| 0000101 | 2 | 1 |
| 0000110 | 2 | 1 |
| 0000111 | 1 | 2 |
| 0001000 | 3 | 2 |
| 0001001 | 2 | 1 |
| 0001010 | 2 | 1 |
| 0001011 | 1 | 0 |
| 0001100 | 2 | 1 |
| 0001101 | 3 | 2 |
| 0001110 | 1 | 2 |
| 0001111 | 2 | 1 |
| 0010000 | 3 | 2 |
| 0010001 | 2 | 1 |
| 0010010 | 2 | 1 |
| 0010011 | 1 | 2 |
| 0010100 | 2 | 1 |
| 0010101 | 1 | 2 |
| 0010110 | 1 | 0 |
| 0010111 | 0 | 1 |
| 0011000 | 2 | 1 |
| 0011001 | 1 | 2 |
| 0011010 | 3 | 2 |
| 0011011 | 2 | 1 |
| 0011100 | 1 | 2 |
| 0011101 | 2 | 3 |
| 0011110 | 2 | 1 |
| 0011111 | 1 | 2 |
| 0100000 | 3 | 2 |
| 0100001 | 2 | 1 |
| 0100010 | 2 | 1 |
| 0100011 | 3 | 2 |
| 0100100 | 2 | 1 |
| 0100101 | 1 | 2 |
| 0100110 | 1 | 2 |
| 0100111 | 2 | 3 |
| 0101000 | 2 | 1 |
| 0101001 | 1 | 2 |
| 0101010 | 1 | 2 |
| 0101011 | 2 | 1 |
| 0101100 | 1 | 0 |
| 0101101 | 2 | 1 |
| 0101110 | 0 | 1 |
| 0101111 | 1 | 2 |
| 0110000 | 2 | 1 |
| 0110001 | 1 | 0 |
| 0110010 | 1 | 2 |
| 0110011 | 2 | 1 |
| 0110100 | 3 | 2 |
| 0110101 | 2 | 1 |
| 0110110 | 2 | 1 |
| 0110111 | 1 | 2 |
| 0111000 | 1 | 2 |
| 0111001 | 0 | 1 |
| 0111010 | 2 | 3 |
| 0111011 | 1 | 2 |
| 0111100 | 2 | 1 |
| 0111101 | 1 | 2 |
| 0111110 | 1 | 2 |
| 0111111 | 2 | 3 |
| 1000000 | 3 | 2 |
| 1000001 | 2 | 1 |
| 1000010 | 2 | 1 |
| 1000011 | 1 | 2 |
| 1000100 | 2 | 1 |
| 1000101 | 1 | 0 |
| 1000110 | 3 | 2 |
| 1000111 | 2 | 1 |
| 1001000 | 2 | 1 |
| 1001001 | 1 | 2 |
| 1001010 | 1 | 2 |

TABLE 2-continued

| Determined Sequence | Minimum Distance M | Minimum Distance M* |
|---|---|---|
| 1001011 | 0 | 1 |
| 1001100 | 1 | 2 |
| 1001101 | 2 | 1 |
| 1001110 | 2 | 3 |
| 1001111 | 1 | 2 |
| 1010000 | 2 | 1 |
| 1010001 | 3 | 2 |
| 1010010 | 1 | 2 |
| 1010011 | 2 | 3 |
| 1010100 | 1 | 2 |
| 1010101 | 2 | 1 |
| 1010110 | 2 | 1 |
| 1010111 | 1 | 2 |
| 1011000 | 1 | 0 |
| 1011001 | 2 | 1 |
| 1011010 | 2 | 1 |
| 1011011 | 1 | 2 |
| 1011100 | 0 | 1 |
| 1011101 | 1 | 2 |
| 1011110 | 1 | 2 |
| 1011111 | 2 | 3 |
| 1100000 | 2 | 1 |
| 1100001 | 1 | 2 |
| 1100010 | 1 | 0 |
| 1100011 | 2 | 1 |
| 1100100 | 1 | 2 |
| 1100101 | 0 | 1 |
| 1100110 | 2 | 1 |
| 1100111 | 1 | 2 |
| 1101000 | 3 | 2 |
| 1101001 | 2 | 3 |
| 1101010 | 2 | 1 |
| 1101011 | 1 | 2 |
| 1101100 | 2 | 1 |
| 1101101 | 1 | 2 |
| 1101110 | 1 | 2 |
| 1101111 | 2 | 3 |
| 1110000 | 1 | 2 |
| 1110001 | 2 | 1 |
| 1110010 | 0 | 1 |
| 1110011 | 1 | 2 |
| 1110100 | 2 | 3 |
| 1110101 | 1 | 2 |
| 1110110 | 1 | 2 |
| 1110111 | 2 | 3 |
| 1111000 | 2 | 1 |
| 1111001 | 1 | 2 |
| 1111010 | 1 | 2 |
| 1111011 | 2 | 3 |
| 1111100 | 1 | 2 |
| 1111101 | 2 | 3 |
| 1111110 | 2 | 3 |
| 1111111 | 3 | 4 |

TABLE 3a

| Determined Sequence | Minimum Distance M | Minimum Distance M* |
|---|---|---|
| 00000000 | 4 | 3 |
| 00000001 | 4 | 3 |
| 00000010 | 3 | 2 |
| 00000011 | 3 | 2 |
| 00000100 | 3 | 2 |
| 00000101 | 3 | 2 |
| 00000110 | 2 | 1 |
| 00000111 | 2 | 2 |
| 00001000 | 3 | 2 |
| 00001001 | 3 | 2 |
| 00001010 | 2 | 2 |
| 00001011 | 2 | 1 |
| 00001100 | 2 | 1 |
| 00001101 | 3 | 2 |
| 00001110 | 1 | 2 |
| 00001111 | 2 | 2 |
| 00010000 | 3 | 2 |
| 00010001 | 3 | 2 |
| 00010010 | 2 | 1 |
| 00010011 | 2 | 2 |
| 00010100 | 2 | 1 |
| 00010101 | 2 | 2 |
| 00010110 | 2 | 0 |
| 00010111 | 1 | 1 |
| 00011000 | 2 | 1 |
| 00011001 | 2 | 2 |
| 00011010 | 3 | 2 |
| 00011011 | 3 | 2 |
| 00011100 | 1 | 2 |
| 00011101 | 2 | 3 |
| 00011110 | 2 | 1 |
| 00011111 | 2 | 2 |
| 00100000 | 3 | 2 |
| 00100001 | 3 | 2 |
| 00100010 | 2 | 1 |
| 00100011 | 3 | 2 |
| 00100100 | 2 | 1 |
| 00100101 | 2 | 2 |
| 00100110 | 1 | 2 |
| 00100111 | 2 | 3 |
| 00101000 | 2 | 1 |
| 00101001 | 2 | 2 |
| 00101010 | 1 | 2 |
| 00101011 | 2 | 2 |
| 00101100 | 1 | 0 |
| 00101101 | 2 | 1 |
| 00101110 | 0 | 1 |
| 00101111 | 1 | 2 |
| 00110000 | 2 | 2 |
| 00110001 | 2 | 1 |
| 00110010 | 1 | 2 |
| 00110011 | 2 | 2 |
| 00110100 | 3 | 2 |
| 00110101 | 3 | 2 |
| 00110110 | 2 | 1 |
| 00110111 | 2 | 2 |
| 00111000 | 2 | 2 |
| 00111001 | 1 | 2 |
| 00111010 | 2 | 3 |
| 00111011 | 2 | 3 |
| 00111100 | 2 | 1 |
| 00111101 | 2 | 2 |
| 00111110 | 1 | 2 |
| 00111111 | 2 | 3 |
| 01000000 | 3 | 2 |
| 01000001 | 3 | 2 |
| 01000010 | 2 | 1 |
| 01000011 | 2 | 2 |
| 01000100 | 2 | 2 |
| 01000101 | 2 | 1 |
| 01000110 | 3 | 2 |
| 01000111 | 3 | 2 |
| 01001000 | 2 | 1 |
| 01001001 | 2 | 2 |
| 01001010 | 2 | 2 |
| 01001011 | 1 | 2 |
| 01001100 | 1 | 2 |
| 01001101 | 2 | 2 |
| 01001110 | 2 | 3 |
| 01001111 | 2 | 3 |
| 01010000 | 2 | 1 |
| 01010001 | 3 | 2 |
| 01010010 | 1 | 2 |
| 01010011 | 2 | 3 |
| 01010100 | 1 | 2 |
| 01010101 | 2 | 2 |

TABLE 3a-continued

| Determined Sequence | Minimum Distance M | M* |
|---|---|---|
| 01010110 | 2 | 1 |
| 01010111 | 2 | 2 |
| 01011000 | 1 | 0 |
| 01011001 | 2 | 1 |
| 01011010 | 2 | 1 |
| 01011011 | 2 | 2 |
| 01011100 | 0 | 1 |
| 01011101 | 1 | 2 |
| 01011110 | 1 | 2 |
| 01011111 | 2 | 3 |
| 01100000 | 2 | 1 |
| 01100001 | 2 | 2 |
| 01100010 | 1 | 0 |
| 01100011 | 2 | 1 |
| 01100100 | 2 | 2 |
| 01100101 | 1 | 2 |
| 01100110 | 2 | 1 |
| 01100111 | 2 | 2 |
| 01101000 | 3 | 2 |
| 01101001 | 3 | 3 |
| 01101010 | 2 | 1 |
| 01101011 | 2 | 2 |
| 01101100 | 2 | 1 |
| 01101101 | 2 | 2 |
| 01101110 | 1 | 2 |
| 01101111 | 2 | 3 |
| 01110000 | 1 | 2 |
| 01110001 | 2 | 2 |
| 01110010 | 0 | 1 |
| 01110011 | 1 | 2 |
| 01110100 | 2 | 3 |
| 01110101 | 2 | 3 |
| 01110110 | 1 | 2 |
| 01110111 | 2 | 3 |
| 01111000 | 2 | 1 |
| 01111001 | 2 | 2 |
| 01111010 | 1 | 2 |
| 01111011 | 2 | 3 |
| 01111100 | 1 | 2 |
| 01111101 | 2 | 3 |
| 01111110 | 2 | 3 |
| 01111111 | 3 | 4 |

TABLE 3b

| Determined Sequence | Minimum Distance M | M* |
|---|---|---|
| 10000000 | 4 | 3 |
| 10000001 | 3 | 2 |
| 10000010 | 3 | 2 |
| 10000011 | 2 | 1 |
| 10000100 | 3 | 2 |
| 10000101 | 2 | 1 |
| 10000110 | 2 | 2 |
| 10000111 | 1 | 2 |
| 10001000 | 3 | 2 |
| 10001001 | 2 | 1 |
| 10001010 | 2 | 1 |
| 10001011 | 1 | 0 |
| 10001100 | 3 | 2 |
| 10001101 | 3 | 2 |
| 10001110 | 2 | 2 |
| 10001111 | 2 | 1 |
| 10010000 | 3 | 2 |
| 10010001 | 2 | 1 |
| 10010010 | 2 | 2 |
| 10010011 | 1 | 2 |
| 10010100 | 2 | 2 |
| 10010101 | 1 | 2 |

TABLE 3b-continued

| Determined Sequence | Minimum Distance M | M* |
|---|---|---|
| 10010110 | 1 | 1 |
| 10010111 | 0 | 2 |
| 10011000 | 2 | 2 |
| 10011001 | 1 | 2 |
| 10011010 | 3 | 2 |
| 10011011 | 2 | 1 |
| 10011100 | 2 | 3 |
| 10011101 | 2 | 3 |
| 10011110 | 2 | 2 |
| 10011111 | 1 | 2 |
| 10100000 | 3 | 2 |
| 10100001 | 2 | 1 |
| 10100010 | 3 | 2 |
| 10100011 | 3 | 2 |
| 10100100 | 2 | 2 |
| 10100101 | 1 | 2 |
| 10100110 | 2 | 3 |
| 10100111 | 2 | 3 |
| 10101000 | 2 | 2 |
| 10101001 | 1 | 2 |
| 10101010 | 2 | 2 |
| 10101011 | 2 | 1 |
| 10101100 | 2 | 1 |
| 10101101 | 2 | 2 |
| 10101110 | 1 | 2 |
| 10101111 | 2 | 2 |
| 10110000 | 2 | 1 |
| 10110001 | 1 | 0 |
| 10110010 | 2 | 2 |
| 10110011 | 2 | 1 |
| 10110100 | 3 | 2 |
| 10110101 | 2 | 1 |
| 10110110 | 2 | 2 |
| 10110111 | 1 | 2 |
| 10111000 | 1 | 2 |
| 10111001 | 0 | 1 |
| 10111010 | 2 | 3 |
| 10111011 | 1 | 2 |
| 10111100 | 2 | 2 |
| 10111101 | 1 | 2 |
| 10111110 | 2 | 3 |
| 10111111 | 2 | 3 |
| 11000000 | 3 | 2 |
| 11000001 | 2 | 1 |
| 11000010 | 2 | 2 |
| 11000011 | 1 | 2 |
| 11000100 | 2 | 1 |
| 11000101 | 1 | 0 |
| 11000110 | 3 | 2 |
| 11000111 | 2 | 1 |
| 11001000 | 2 | 2 |
| 11001001 | 1 | 2 |
| 11001010 | 1 | 2 |
| 11001011 | 0 | 1 |
| 11001100 | 2 | 2 |
| 11001101 | 2 | 1 |
| 11001110 | 2 | 3 |
| 11001111 | 1 | 2 |
| 11010000 | 3 | 2 |
| 11010001 | 3 | 2 |
| 11010010 | 2 | 3 |
| 11010011 | 2 | 3 |
| 11010100 | 2 | 2 |
| 11010101 | 2 | 1 |
| 11010110 | 2 | 2 |
| 11010111 | 1 | 2 |
| 11011000 | 2 | 1 |
| 11011001 | 2 | 2 |
| 11011010 | 2 | 2 |
| 11011011 | 1 | 2 |
| 11011100 | 1 | 2 |
| 11011101 | 2 | 2 |
| 11011110 | 2 | 3 |
| 11011111 | 2 | 3 |
| 11100000 | 2 | 2 |

TABLE 3b-continued

| Determined Sequence | Minimum Distance M | M* |
|---|---|---|
| 11100001 | 1 | 2 |
| 11100010 | 2 | 1 |
| 11100011 | 2 | 2 |
| 11100100 | 1 | 2 |
| 11100101 | 0 | 1 |
| 11100110 | 2 | 2 |
| 11100111 | 1 | 2 |
| 11101000 | 3 | 3 |
| 11101001 | 2 | 3 |
| 11101010 | 2 | 2 |
| 11101011 | 1 | 2 |
| 11101100 | 2 | 2 |
| 11101101 | 1 | 2 |
| 11101110 | 2 | 3 |
| 11101111 | 2 | 3 |
| 11110000 | 2 | 2 |
| 11110001 | 2 | 1 |
| 11110010 | 1 | 2 |
| 11110011 | 2 | 2 |
| 11110100 | 2 | 3 |
| 11110101 | 1 | 2 |
| 11110110 | 2 | 3 |
| 11110111 | 2 | 3 |
| 11111000 | 2 | 2 |
| 11111001 | 1 | 2 |
| 11111010 | 2 | 3 |
| 11111011 | 2 | 3 |
| 11111100 | 2 | 3 |
| 11111101 | 2 | 3 |
| 11111110 | 3 | 4 |
| 11111111 | 3 | 4 |

In the present embodiment, since the mark image containing marks outside the range are acquired together with the marks within the 6*6 range as described in FIG. 4, the number of sequences having a length of 6 or longer corresponding to partial sequences of the cyclic main number sequences obtained through determination from the mark image is equal to or larger than 6 for both the x-direction and the y-direction. Therefore, when the multiple detected sequences are comprehensively judged, improvement in resistance against error can be expected. For example, by obtaining minimum Hamming distances based on Table 1 to Table 3 for the multiple detected sequences, by obtaining a total value of the obtained multiple minimum Hamming distances, and by determining whether it is based on the cyclic main number sequence M or based on the supplementary number sequence M* using the total value of the minimum Hamming distances; it is possible to improve resistance against error when determining an angle of rotation of the mark image.

In the manner described above, it is possible to detect rotation of the mark image in increments of 90 degrees, and remove the rotation.

[Correction of Error of Cyclic Main Number Sequence and Estimation of Position]

Next, correction of error in a partial sequence corresponding to the cyclic main number sequence M will be described. Here, only the process in the x-direction will be described since the process for the x-direction and the process for the y-direction are identical. The position code mx in the x-direction obtained from a mark image at a coordinate (x, y) is defined as mx(x, y). With regard to the position code mx, a sequence having a continuous length of 6 arranged in the y-direction starting from the coordinate (x, y) is defined as S(x). The sequence S(x) is a sequence consisting of mx(x, y), mx(x, y+1), . . . , mx(x, y+5). The sequence S(x) corresponds to a partial sequence of the cyclic main number sequence M. Table 4 shows, with respect to the obtained sequence S(x), a partial sequence having the closest Hamming distance among 7 types of mutually different partial sequences having a length of 6 contained in the cyclic main number sequence M, a Hamming distance thereof, and a place p(x) of the partial sequence in the cyclic main number sequence M. Furthermore, a sequence S(x) that is blank in Table 4 is a sequence for which a partial sequence having the closest Hamming distance cannot be specified, since there are multiple partial sequences having equal Hamming distances in the 7 types of mutually different partial sequences contained in the cyclic main number sequence M. As can be understood from Table 4, the 7 types of mutually different partial sequences contained in the cyclic main number sequence M, and sequences having only one term incorrect from those partial sequence do not overlap and are separate. Thus, the 7 types of mutually different partial sequences contained in the cyclic main number sequence M are identified while allowing an error in a single term. The necessary condition to have this property is the above described formula [1] of "$K+K*(b-1)*N \leq b^N$." It should be noted that although Table 4 describes 7 types of mutually different partial sequences contained in the cyclic main number sequence M, and Hamming distances from the partial sequences; these are not essential, and, in order to decode the position code, it is sufficient when at least the place p(x) of the partial sequence in the cyclic main number sequence M is known.

TABLE 4

| S(x) | Partial Sequence | Distance | p(x) |
|---|---|---|---|
| 000000 | | | |
| 000001 | | | |
| 000010 | | | |
| 000011 | 001011 | 1 | 0 |
| 000100 | | | |
| 000101 | 100101 | 1 | 6 |
| 000110 | | | |
| 000111 | 010111 | 1 | 1 |
| 001000 | | | |
| 001001 | 001011 | 1 | 0 |
| 001010 | 001011 | 1 | 0 |
| 001011 | 001011 | 0 | 0 |
| 001100 | 011100 | 1 | 3 |
| 001101 | | | |
| 001110 | 101110 | 1 | 2 |
| 001111 | 001011 | 1 | 0 |
| 010000 | | | |
| 010001 | | | |
| 010010 | 110010 | 1 | 5 |
| 010011 | 010111 | 1 | 1 |
| 010100 | 011100 | 1 | 3 |
| 010101 | 010111 | 1 | 1 |
| 010110 | 010111 | 1 | 1 |
| 010111 | 010111 | 0 | 1 |
| 011000 | 011100 | 1 | 3 |
| 011001 | 111001 | 1 | 4 |
| 011010 | | | |
| 011011 | 001011 | 1 | 0 |
| 011100 | 011100 | 0 | 3 |
| 011101 | 011100 | 1 | 3 |
| 011110 | 011100 | 1 | 3 |
| 011111 | 010111 | 1 | 1 |
| 100000 | | | |
| 100001 | 100101 | 1 | 6 |
| 100010 | 110010 | 1 | 5 |
| 100011 | | | |
| 100100 | 100101 | 1 | 6 |
| 100101 | 100101 | 0 | 6 |

TABLE 4-continued

| S(x) | Partial Sequence | Distance | p(x) |
|---|---|---|---|
| 100110 | 101110 | 1 | 2 |
| 100111 | 100101 | 1 | 6 |
| 101000 | | | |
| 101001 | 111001 | 1 | 4 |
| 101010 | 101110 | 1 | 2 |
| 101011 | 001011 | 1 | 0 |
| 101100 | 101110 | 1 | 2 |
| 101101 | 100101 | 1 | 6 |
| 101110 | 101110 | 0 | 2 |
| 101111 | 101110 | 1 | 2 |
| 110000 | 110010 | 1 | 5 |
| 110001 | 111001 | 1 | 4 |
| 110010 | 110010 | 0 | 5 |
| 110011 | 110010 | 1 | 5 |
| 110100 | | | |
| 110101 | 100101 | 1 | 6 |
| 110110 | 110010 | 1 | 5 |
| 110111 | 010111 | 1 | 1 |
| 111000 | 111001 | 1 | 4 |
| 111001 | 111001 | 0 | 4 |
| 111010 | 110010 | 1 | 5 |
| 111011 | 111001 | 1 | 4 |
| 111100 | 011100 | 1 | 3 |
| 111101 | 111001 | 1 | 4 |
| 111110 | 101110 | 1 | 2 |
| 111111 | | | |

The process used when acquiring, from the mark image, a sequence having a length of 7 corresponding to the cyclic main number sequence M will be discussed. With regard to the position code mx, a sequence having a continuous length of 7 arranged in the y-direction starting from the coordinate (x, y) is defined as S(x). The sequence S(x) is a sequence consisting of mx(x, y), mx(x, y+1), . . . , mx(x, y+6). The sequence S(x) corresponds to a partial sequence of the cyclic main number sequence M. Tables 5a and 5b show, with respect to the obtained sequence S(x), a partial sequence having the closest Hamming distance among 7 types of mutually different partial sequences having a length of 7 contained in the cyclic main number sequence M, a Hamming distance thereof, and a place p(x) of the partial sequence in the cyclic main number sequence M. It should be noted that the idea similar to that for Table 4 is applied for a sequence S(x) that is blank in Tables 5a and 5b.

TABLE 5a

| S(x) | Partial Sequence | Distance | p(x) |
|---|---|---|---|
| 0000000 | | | |
| 0000001 | | | |
| 0000010 | | | |
| 0000011 | | | |
| 0000100 | | | |
| 0000101 | | | |
| 0000110 | | | |
| 0000111 | 0010111 | 1 | 0 |
| 0001000 | | | |
| 0001001 | | | |
| 0001010 | | | |
| 0001011 | 1001011 | 1 | 6 |
| 0001100 | | | |
| 0001101 | | | |
| 0001110 | 0101110 | 1 | 1 |
| 0001111 | | | |
| 0010000 | | | |
| 0010001 | | | |
| 0010010 | | | |
| 0010011 | 0010111 | 1 | 0 |
| 0010100 | | | |
| 0010101 | 0010111 | 1 | 0 |
| 0010110 | 0010111 | 1 | 0 |
| 0010111 | 0010111 | 0 | 0 |
| 0011000 | | | |
| 0011001 | 0111001 | 1 | 3 |
| 0011010 | | | |
| 0011011 | | | |
| 0011100 | 1011100 | 1 | 2 |
| 0011101 | | | |
| 0011110 | | | |
| 0011111 | 0010111 | 1 | 0 |
| 0100000 | | | |
| 0100001 | | | |
| 0100010 | | | |
| 0100011 | | | |
| 0100100 | | | |
| 0100101 | 1100101 | 1 | 5 |
| 0100110 | 0101110 | 1 | 1 |
| 0100111 | | | |
| 0101000 | | | |
| 0101001 | 0111001 | 1 | 3 |
| 0101010 | 0101110 | 1 | 1 |
| 0101011 | | | |
| 0101100 | 0101110 | 1 | 1 |
| 0101101 | | | |
| 0101110 | 0101110 | 0 | 1 |
| 0101111 | 0101110 | 1 | 1 |
| 0110000 | | | |
| 0110001 | 0111001 | 1 | 3 |
| 0110010 | 1110010 | 1 | 4 |
| 0110011 | | | |
| 0110100 | | | |
| 0110101 | | | |
| 0110110 | | | |
| 0110111 | 0010111 | 1 | 0 |
| 0111000 | 0111001 | 1 | 3 |
| 0111001 | 0111001 | 0 | 3 |
| 0111010 | | | |
| 0111011 | 0111001 | 1 | 3 |
| 0111100 | | | |
| 0111101 | 0111001 | 1 | 3 |
| 0111110 | 0101110 | 1 | 1 |
| 0111111 | | | |

TABLE 5b

| S(x) | Partial Sequence | Distance | p(x) |
|---|---|---|---|
| 1000000 | | | |
| 1000001 | | | |
| 1000010 | | | |
| 1000011 | 1001011 | 1 | 6 |
| 1000100 | | | |
| 1000101 | 1100101 | 1 | 5 |
| 1000110 | | | |
| 1000111 | | | |
| 1001000 | | | |
| 1001001 | 1001011 | 1 | 6 |
| 1001010 | 1001011 | 1 | 6 |
| 1001011 | 1001011 | 0 | 6 |
| 1001100 | 1011100 | 1 | 2 |
| 1001101 | | | |
| 1001110 | | | |
| 1001111 | 1001011 | 1 | 6 |
| 1010000 | | | |
| 1010001 | | | |
| 1010010 | 1110010 | 1 | 4 |
| 1010011 | | | |
| 1010100 | 1011100 | 1 | 2 |
| 1010101 | | | |
| 1010110 | | | |

TABLE 5b-continued

| S(x) | Partial Sequence | Distance | p(x) |
|---|---|---|---|
| 1010111 | 0010111 | 1 | 0 |
| 1011000 | 1011100 | 1 | 2 |
| 1011001 | | | |
| 1011010 | | | |
| 1011011 | 1001011 | 1 | 6 |
| 1011100 | 1011100 | 0 | 2 |
| 1011101 | 1011100 | 1 | 2 |
| 1011110 | 1011100 | 1 | 2 |
| 1011111 | | | |
| 1100000 | | | |
| 1100001 | 1100101 | 1 | 5 |
| 1100010 | 1110010 | 1 | 4 |
| 1100011 | | | |
| 1100100 | 1100101 | 1 | 5 |
| 1100101 | 1100101 | 0 | 5 |
| 1100110 | | | |
| 1100111 | 1100101 | 1 | 5 |
| 1101000 | | | |
| 1101001 | | | |
| 1101010 | | | |
| 1101011 | 1001011 | 1 | 6 |
| 1101100 | | | |
| 1101101 | 1100101 | 1 | 5 |
| 1101110 | 0101110 | 1 | 1 |
| 1101111 | | | |
| 1110000 | 1110010 | 1 | 4 |
| 1110001 | | | |
| 1110010 | 1110010 | 0 | 4 |
| 1110011 | 1110010 | 1 | 4 |
| 1110100 | | | |
| 1110101 | 1100101 | 1 | 5 |
| 1110110 | 1110010 | 1 | 4 |
| 1110111 | | | |
| 1111000 | | | |
| 1111001 | 0111001 | 1 | 3 |
| 1111010 | 1110010 | 1 | 4 |
| 1111011 | | | |
| 1111100 | 1011100 | 1 | 2 |
| 1111101 | | | |
| 1111110 | | | |
| 1111111 | | | |

The same process described above may be used when acquiring, from the mark image, a sequence having a length of 8 or longer corresponding to the cyclic main number sequence M. For example, with respect to a sequence having a length of 8, Tables 6a to 6d are used in a manner similar to that described above to specify a place p(x) of a partial sequence in the cyclic main number sequence. As can be understood from Table 6, there are cases where the original partial sequence can be specified even when an error larger than 1 in Hamming distance is generated.

TABLE 6a

| S(x) | Partial Sequence | Distance | p(x) |
|---|---|---|---|
| 00000000 | | | |
| 00000001 | | | |
| 00000010 | | | |
| 00000011 | | | |
| 00000100 | | | |
| 00000101 | | | |
| 00000110 | 00101110 | 2 | 0 |
| 00000111 | 10010111 | 2 | 6 |
| 00001000 | | | |
| 00001001 | | | |
| 00001010 | 00101110 | 2 | 0 |
| 00001011 | 11001011 | 2 | 5 |
| 00001100 | | | |
| 00001101 | | | |

TABLE 6a-continued

| S(x) | Partial Sequence | Distance | p(x) |
|---|---|---|---|
| 00001110 | 00101110 | 1 | 0 |
| 00001111 | 00101110 | 2 | 0 |
| 00010000 | | | |
| 00010001 | | | |
| 00010010 | 01110010 | 2 | 3 |
| 00010011 | 10010111 | 2 | 6 |
| 00010100 | 01011100 | 2 | 1 |
| 00010101 | 10010111 | 2 | 6 |
| 00010110 | 10010111 | 2 | 6 |
| 00010111 | 10010111 | 1 | 6 |
| 00011000 | 01011100 | 2 | 1 |
| 00011001 | 10111001 | 2 | 2 |
| 00011010 | | | |
| 00011011 | | | |
| 00011100 | 01011100 | 1 | 1 |
| 00011101 | 01011100 | 2 | 1 |
| 00011110 | | | |
| 00011111 | 10010111 | 2 | 6 |
| 00100000 | | | |
| 00100001 | | | |
| 00100010 | | | |
| 00100011 | | | |
| 00100100 | 00101110 | 2 | 0 |
| 00100101 | 11100101 | 2 | 4 |
| 00100110 | 00101110 | 1 | 0 |
| 00100111 | 00101110 | 2 | 0 |
| 00101000 | 00101110 | 2 | 0 |
| 00101001 | 10111001 | 2 | 2 |
| 00101010 | 00101110 | 1 | 0 |
| 00101011 | 00101110 | 2 | 0 |
| 00101100 | 00101110 | 1 | 0 |
| 00101101 | 00101110 | 2 | 0 |
| 00101110 | 00101110 | 0 | 0 |
| 00101111 | 00101110 | 1 | 0 |
| 00110000 | 01110010 | 2 | 3 |
| 00110001 | 10111001 | 2 | 2 |
| 00110010 | 01110010 | 1 | 3 |
| 00110011 | 01110010 | 2 | 3 |
| 00110100 | | | |
| 00110101 | | | |
| 00110110 | | | |
| 00110111 | 10010111 | 2 | 6 |
| 00111000 | 10111001 | 2 | 2 |
| 00111001 | 10111001 | 1 | 2 |
| 00111010 | | | |
| 00111011 | 10111001 | 2 | 2 |
| 00111100 | | | |
| 00111101 | 10111001 | 2 | 2 |
| 00111110 | 00101110 | 1 | 0 |
| 00111111 | 00101110 | 2 | 0 |

TABLE 6b

| S(x) | Partial Sequence | Distance | p(x) |
|---|---|---|---|
| 01000000 | | | |
| 01000001 | | | |
| 01000010 | 01110010 | 2 | 3 |
| 01000011 | 11001011 | 2 | 5 |
| 01000100 | 01011100 | 2 | 1 |
| 01000101 | 11100101 | 2 | 4 |
| 01000110 | | | |
| 01000111 | | | |
| 01001000 | 01011100 | 2 | 1 |
| 01001001 | 11001011 | 2 | 5 |
| 01001010 | 11001011 | 2 | 5 |
| 01001011 | 11001011 | 1 | 5 |
| 01001100 | 01011100 | 1 | 1 |
| 01001101 | 01011100 | 2 | 1 |
| 01001110 | | | |
| 01001111 | 11001011 | 2 | 5 |
| 01010000 | | | |
| 01010001 | | | |

TABLE 6b-continued

| S(x) | Partial Sequence | Distance | p(x) |
|---|---|---|---|
| 01010010 | 01110010 | 1 | 3 |
| 01010011 | 01110010 | 2 | 3 |
| 01010100 | 01011100 | 1 | 1 |
| 01010101 | 01011100 | 2 | 1 |
| 01010110 | | | |
| 01010111 | 10010111 | 2 | 6 |
| 01011000 | 01011100 | 1 | 1 |
| 01011001 | 01011100 | 2 | 1 |
| 01011010 | | | |
| 01011011 | 11001011 | 2 | 5 |
| 01011100 | 01011100 | 0 | 1 |
| 01011101 | 01011100 | 1 | 1 |
| 01011110 | 01011100 | 1 | 1 |
| 01011111 | 01011100 | 2 | 1 |
| 01100000 | 01110010 | 2 | 3 |
| 01100001 | 11100101 | 2 | 4 |
| 01100010 | 01110010 | 1 | 3 |
| 01100011 | 01110010 | 2 | 3 |
| 01100100 | 11100101 | 2 | 4 |
| 01100101 | 11100101 | 1 | 4 |
| 01100110 | | | |
| 01100111 | 11100101 | 2 | 4 |
| 01101000 | | | |
| 01101001 | | | |
| 01101010 | | | |
| 01101011 | 11001011 | 2 | 5 |
| 01101100 | | | |
| 01101101 | 11100101 | 2 | 4 |
| 01101110 | 00101110 | 1 | 0 |
| 01101111 | 00101110 | 2 | 0 |
| 01110000 | 01110010 | 1 | 3 |
| 01110001 | 01110010 | 2 | 3 |
| 01110010 | 01110010 | 0 | 3 |
| 01110011 | 01110010 | 1 | 3 |
| 01110100 | | | |
| 01110101 | 11100101 | 2 | 4 |
| 01110110 | 01110010 | 1 | 3 |
| 01110111 | 01110010 | 2 | 3 |
| 01111000 | | | |
| 01111001 | 10111001 | 2 | 2 |
| 01111010 | 01110010 | 1 | 3 |
| 01111011 | 01110010 | 2 | 3 |
| 01111100 | 01011100 | 1 | 1 |
| 01111101 | 01011100 | 2 | 1 |
| 01111110 | | | |
| 01111111 | | | |

TABLE 6c

| S(x) | Partial Sequence | Distance | p(x) |
|---|---|---|---|
| 10000000 | | | |
| 10000001 | | | |
| 10000010 | | | |
| 10000011 | | | |
| 10000100 | | | |
| 10000101 | | | |
| 10000110 | 10010111 | 2 | 6 |
| 10000111 | 10010111 | 1 | 6 |
| 10001000 | | | |
| 10001001 | | | |
| 10001010 | 11001011 | 2 | 5 |
| 10001011 | 11001011 | 1 | 5 |
| 10001100 | | | |
| 10001101 | | | |
| 10001110 | 00101110 | 2 | 0 |
| 10001111 | | | |
| 10010000 | | | |
| 10010001 | | | |
| 10010010 | 10010111 | 2 | 6 |
| 10010011 | 10010111 | 1 | 6 |
| 10010100 | 10010111 | 2 | 6 |
| 10010101 | 10010111 | 1 | 6 |

TABLE 6c-continued

| S(x) | Partial Sequence | Distance | p(x) |
|---|---|---|---|
| 10010110 | 10010111 | 1 | 6 |
| 10010111 | 10010111 | 0 | 6 |
| 10011000 | 10111001 | 2 | 2 |
| 10011001 | 10111001 | 1 | 2 |
| 10011010 | | | |
| 10011011 | | | |
| 10011100 | 01011100 | 2 | 1 |
| 10011101 | | | |
| 10011110 | 10010111 | 2 | 6 |
| 10011111 | 10010111 | 1 | 6 |
| 10100000 | | | |
| 10100001 | | | |
| 10100010 | | | |
| 10100011 | | | |
| 10100100 | 11100101 | 2 | 4 |
| 10100101 | 11100101 | 1 | 4 |
| 10100110 | 00101110 | 2 | 0 |
| 10100111 | | | |
| 10101000 | 10111001 | 2 | 2 |
| 10101001 | 10111001 | 1 | 2 |
| 10101010 | 00101110 | 2 | 0 |
| 10101011 | | | |
| 10101100 | 00101110 | 2 | 0 |
| 10101101 | | | |
| 10101110 | 00101110 | 1 | 0 |
| 10101111 | 00101110 | 2 | 0 |
| 10110000 | 10111001 | 2 | 2 |
| 10110001 | 10111001 | 1 | 2 |
| 10110010 | 01110010 | 2 | 3 |
| 10110011 | | | |
| 10110100 | | | |
| 10110101 | | | |
| 10110110 | 10010111 | 2 | 6 |
| 10110111 | 10010111 | 1 | 6 |
| 10111000 | 10111001 | 1 | 2 |
| 10111001 | 10111001 | 0 | 2 |
| 10111010 | 10111001 | 2 | 2 |
| 10111011 | 10111001 | 1 | 2 |
| 10111100 | 10111001 | 2 | 2 |
| 10111101 | 10111001 | 1 | 2 |
| 10111110 | 00101110 | 2 | 0 |
| 10111111 | | | |

TABLE 6d

| S(x) | Partial Sequence | Distance | p(x) |
|---|---|---|---|
| 11000000 | | | |
| 11000001 | | | |
| 11000010 | 11001011 | 2 | 5 |
| 11000011 | 11001011 | 1 | 5 |
| 11000100 | 11100101 | 2 | 4 |
| 11000101 | 11100101 | 1 | 4 |
| 11000110 | | | |
| 11000111 | | | |
| 11001000 | 11001011 | 2 | 5 |
| 11001001 | 11001011 | 1 | 5 |
| 11001010 | 11001011 | 1 | 5 |
| 11001011 | 11001011 | 0 | 5 |
| 11001100 | 01011100 | 2 | 1 |
| 11001101 | | | |
| 11001110 | 11001011 | 2 | 5 |
| 11001111 | 11001011 | 1 | 5 |
| 11010000 | | | |
| 11010001 | | | |
| 11010010 | 01110010 | 2 | 3 |
| 11010011 | | | |
| 11010100 | 01011100 | 2 | 1 |
| 11010101 | | | |
| 11010110 | 10010111 | 2 | 6 |
| 11010111 | 10010111 | 1 | 6 |
| 11011000 | 01011100 | 2 | 1 |
| 11011001 | | | |

TABLE 6d-continued

| S(x) | Partial Sequence | Distance | p(x) |
|---|---|---|---|
| 11011010 | 11001011 | 2 | 5 |
| 11011011 | 11001011 | 1 | 5 |
| 11011100 | 01011100 | 1 | 1 |
| 11011101 | 01011100 | 2 | 1 |
| 11011110 | 01011100 | 2 | 1 |
| 11011111 | | | |
| 11100000 | 11100101 | 2 | 4 |
| 11100001 | 11100101 | 1 | 4 |
| 11100010 | 01110010 | 2 | 3 |
| 11100011 | | | |
| 11100100 | 11100101 | 1 | 4 |
| 11100101 | 11100101 | 0 | 4 |
| 11100110 | 11100101 | 2 | 4 |
| 11100111 | 11100101 | 1 | 4 |
| 11101000 | | | |
| 11101001 | | | |
| 11101010 | 11001011 | 2 | 5 |
| 11101011 | 11001011 | 1 | 5 |
| 11101100 | 11100101 | 2 | 4 |
| 11101101 | 11100101 | 1 | 4 |
| 11101110 | 00101110 | 2 | 0 |
| 11101111 | | | |
| 11110000 | 01110010 | 2 | 3 |
| 11110001 | | | |
| 11110010 | 01110010 | 1 | 3 |
| 11110011 | 01110010 | 2 | 3 |
| 11110100 | 11100101 | 2 | 4 |
| 11110101 | 11100101 | 1 | 4 |
| 11110110 | 01110010 | 2 | 3 |
| 11110111 | | | |
| 11111000 | 10111001 | 2 | 2 |
| 11111001 | 10111001 | 1 | 2 |
| 11111010 | 01110010 | 2 | 3 |
| 11111011 | | | |
| 11111100 | 01011100 | 2 | 1 |
| 11111101 | | | |
| 11111110 | | | |
| 11111111 | | | |

In the manner described above, it is possible to obtain the places p(x) to p(x+5) in the cyclic main number sequence M for the sequences S(x) to S(x+5) acquired from the mark image.

[Difference Number and Secondary Number Sequence]

Next, difference numbers d(x) to d(x+4) are obtained from the places p(x) to p(x+5) in a range of x to (x+4) in accordance with the above described formula [2] of "d(x)= (p(x+1)−p(x)) mod K." Here, a case where K=7 is described as an example.

The difference number d(x) is converted into a first difference number dc(1, x) in accordance with "dc(1, x)=(d(x)−1) mod 2," and into a second difference number dc(2, x) in accordance with "dc(2, x)=(d(x)−1) div 2." Here, mod 2 is a calculation for obtaining the remainder when divided by 2, and div 2 is a calculation for obtaining the quotient when divided by 2. Thus, d(x)=1+dc(1, x)+2*dc(2, x) is satisfied. Generally, when converting m number of difference numbers dc(1, x) to dc(m, x); the converting is conducted such that the following formula [3] is satisfied. Here $b_m$ represents the base number of the m-th secondary number sequence, and C represents a constant.

$$d(x)=C+dc(1,x)+b_{-1}{*}dc(2,x)+\ldots+b_1{*}b_2{*}\ldots{*}b_{m-1}{*}dc(m,x) \quad [3]$$

The difference number d(x) corresponds to a term of the primary number sequence, the first difference number dc(1, x) corresponds to a term a1 (x) of the first secondary number sequence A1, and the second difference number dc(2, x) corresponds to a term a2(x) of the second secondary number sequence A2.

Next, a place p1, where a sequence having a length of 5 and consisting of the first difference numbers dc(1, x) to dc(1, x+4) is detected in the first secondary number sequence A1, is obtained, and a place p2, where a sequence having a length of 5 and consisting of the second difference numbers dc(2, x) to dc(2, x+4) is detected in the second secondary number sequence A2, is obtained. On the other hand, when a place, where a sequence having a length of 5 and consisting of difference number d(x) to d(x+4) is detected in the primary number sequence, is defined as P, the following relationships between the place P, and place p1 and place p2 exist.

$$P \equiv p1 \bmod 11$$

$$P \equiv p2 \bmod 12$$

Thus, the place P is congruent to place p1 modulo 11, and the place P is congruent to place p2 modulo 12. Here, 11 is the length of the first secondary number sequence, and 12 is the length of the second secondary number sequence.

As the method for obtaining the place P from the place p1 and the place p2, the Chinese remainder theorem is known. When L=prod(i=1, m) li and qi*(L/li)≡1(mod li); the place P can be obtained from the following formula [4].

$$P=(\text{sum}(i=1,m)((1/li){*}pi{*}qi)) \bmod L \quad [4]$$

In the present embodiment, since m=2, l1=31, l2=241, L=7471, q1=22, q2=70, are applied, the place P can be obtained from the place p1 and the place p2 using the following formula.

$$P=(5302{*}p1+2170{*}p2) \bmod 7471$$

As described above, in the present embodiment, multiple sequences are extracted from an acquired mark image obtained through detecting or the like, and places, where the extracted multiple sequences are detected as partial sequences in the cyclic main number sequence, are obtained. A difference number of places adjacent to each other among the obtained multiple places in the cyclic main number sequence is obtained, and the difference number is further broken down into multiple difference numbers. Then, a place, where a sequence consisting of the broken down difference numbers is detected as a partial sequence in the secondary number sequence, is obtained, and the position where the mark image is arranged can be obtained from the place in the multiple secondary number sequences based on the Chinese remainder theorem. In addition, by applying the technique of the present embodiment for dimensions equal to or higher than two dimensions, coordinate positions in dimensions equal to or higher than two can be represented.

The present disclosure provides a position code having excellent resistance against errors, a device for detecting a position code, a method for detecting a position code, a method for generating a position code, and a method for decoding a position code that has been detected, particularly by, when a coordinate position in a two-dimensional plane is to be represented in a mark image having a N*N range, and by designing the length K of the cyclic main number sequence so as to satisfy the condition of $K+K*(b-1)*N \leq b^N$. In addition, the present disclosure provides a function and method for removing uncertainty in a mark image due to rotation, and a function and method for correcting errors in the cyclic main number sequence.

Furthermore, the present disclosure can provide a computer program for executing a method for generating a position code having excellent resistance against errors or a method for decoding a detected position code, and a product in which the position code is used.

INDUSTRIAL APPLICABILITY

The device and method for detecting a position code of the present disclosure is applicable to an electronic pen or the like for optically or electronically identifying a coordinate position, and is particularly useful in cases in which improvement in resistance against errors is desired.

DESCRIPTION OF THE REFERENCE CHARACTERS 21 coordinate grid
22 mark

The invention claimed is:

1. A detecting device configured to detect a position code, the position code consisting of a plurality of cyclic main number sequences that are each shifted by a predetermined amount and arranged in a one-dimensional direction, each of the cyclic main number sequences consisting of cycles of a main number sequence that has a base number b and a length K and having K types of characteristic partial sequences with a predetermined length,
the detecting device including:
a detection section that detects, from each of at least two adjacent cyclic main number sequences among the plurality of cyclic main number sequences, a partial sequence having a length N and satisfying a formula $K+K*(b-1)*N \leq b^N$ (b, K, and N are integers equal to or larger than 2);
a non-transitory memory storing a program, which when executed by a hardware processor causes the detecting device to operate as:
a determination section that determines a place of each of the detected partial sequences having the length N in each of the cyclic main number sequences, and
an acquisition section that acquires, based on the determined places, positional information given to a detected position in the position code,
wherein determination section:
specifies, for each of the detected partial sequences having the length N, a characteristic partial sequence having the smallest Hamming distance from each of the detected partial sequences having the length N, among the K types of characteristic partial sequences; and
determines places of the specified characteristic partial sequences in the respective cyclic main number sequences.

2. The detecting device according to claim 1, wherein the acquisition section:
obtains, from the determined places, a difference of places between the adjacent cyclic main number sequences as a primary number sequence;
obtains, as a plurality of secondary number sequences, numerical values of each digit obtained when the primary number sequence is represented as mixed base numbers;
acquires, from each of the plurality of secondary number sequences, a partial sequence having a length L (L is an integer equal to or larger than 2);
determines places of the acquired partial sequences having the length L in the respective secondary number sequences; and
acquires positional information given to the detected position of the position code based on the determined places.

3. The detecting device according to claim 2, wherein the length L is configured as L=N−1.

4. The detecting device according to claim 1, wherein the determination section:
calculates, for each of the detected partial sequences having the length N, a minimum Hamming distance from the cyclic main number sequences, and a minimum Hamming distance from supplementary number sequences obtained by inverting a polarity of the cyclic main number sequences and reversing the alignment order thereof;
and conducts, when the minimum Hamming distance from the supplementary number sequences is smaller than the minimum Hamming distance from the cyclic main number sequences, a rotation removal process against the detected partial sequences having the length N.

5. The detecting device according to claim 1, wherein the determination section:
calculates, for each the detected partial sequences having the length N, a minimum Hamming distance from the cyclic main number sequences, and obtain a total value thereof, and calculate, for each the detected partial sequences having the length N, a minimum Hamming distance from supplementary number sequences obtained by inverting a polarity of each of the cyclic main number sequences and reversing the alignment order thereof, and obtain a total value of the minimum Hamming distances from the supplementary number sequences; and
conducts, when the total value of the minimum Hamming distances from the supplementary number sequences is smaller than the total value of the minimum Hamming distances from the cyclic main number sequences, a rotation removal process against the detected partial sequences having the length N.

6. The detecting device according to claim 4, wherein the determination section corrects, based on the calculated minimum Hamming distance, an effect of rotation generated in the position code in increments of 90 degrees.

7. The detecting device according to claim 5, wherein the determination section corrects, based on the total value of the calculated minimum Hamming distances, an effect of rotation generated in the position code in increments of 90 degrees.

8. A method for detecting a position code,
the position code consisting of a plurality of cyclic main number sequences that are each shifted by a predetermined amount and arranged in a one-dimensional direction, each of the cyclic main number sequences consisting of cycles of a main number sequence that has a base number b and a length K and having K types of characteristic partial sequences with a predetermined length,
the detecting method including the steps of:
detecting, from each of at least two adjacent cyclic main number sequences among the plurality of cyclic main number sequences, a partial sequence that has a length N and satisfies a condition of a formula $K+K*(b-1)*N \leq b^N$ (b, K, and N are integers equal to or larger than 2);
determining places of the detected partial sequences that has the length N in the respective cyclic main number sequences; and acquiring, based on the determined places, positional information given to a detected position in the position code, wherein the determining of the detected partial sequences includes:

specifying, for each of the detected partial sequences having the length N, a characteristic partial sequence having the smallest Hamming distance from each of the detected partial sequences having the length N, among the K types of characteristic partial sequences; and determining places of the specified characteristic partial sequences in the respective cyclic main number sequences.

9. A non-transitory computer-readable storage medium having stored therein a computer readable program that causes a computer to execute the steps of:

with respect to a position code consisting of a plurality of cyclic main number sequences that are each shifted by a predetermined amount and arranged in a one-dimensional direction, each of the cyclic main number sequences consisting of cycles of a main number sequence that has a base number b and a length K and having K types of characteristic partial sequences with a predetermined length, detecting, from each of at least two adjacent cyclic main number sequences among the plurality of cyclic main number sequences, a partial sequence that has a length N and satisfies a condition of a formula $K+K*(b-1)*N \leq b^N$ (b, K, and N are integers equal to or larger than 2);

determining places of the detected partial sequences that has the length N in the respective cyclic main number sequences; and acquiring, based on the determined places, positional information given to a detected position in the position code, wherein the determining of the detected partial sequences includes:

specifying, for each of the detected partial sequences having the length N, a characteristic partial sequence having the smallest Hamming distance from each of the detected partial sequences having the length N, among the K types of characteristic partial sequences; and determining places of the specified characteristic partial sequences in the respective cyclic main number sequences.

10. The method for detecting a position code according to claim 8, wherein the position code is formed on a product in a readable manner.

* * * * *